US009685012B2

(12) United States Patent
Saeedi et al.

(10) Patent No.: US 9,685,012 B2
(45) Date of Patent: Jun. 20, 2017

(54) ACCESS MANAGEMENT AND RESOURCE SHARING PLATFORM BASED ON BIOMETRIC IDENTITY

(71) Applicant: Gate Labs Inc., San Francisco, CA (US)

(72) Inventors: Ehsan Saeedi, San Francisco, CA (US); Danial Ehyaie, San Francisco, CA (US); Harvey Ho, San Francisco, CA (US)

(73) Assignee: Gate Labs Inc., San Francisco, CA (US)

( * ) Notice: Subject to any disclaimer, the term of this patent is extended or adjusted under 35 U.S.C. 154(b) by 0 days.

(21) Appl. No.: 14/641,069

(22) Filed: Mar. 6, 2015

(65) Prior Publication Data

US 2016/0055695 A1 Feb. 25, 2016

Related U.S. Application Data

(60) Provisional application No. 62/039,822, filed on Aug. 20, 2014.

(51) Int. Cl.

*G05B 1/00* (2006.01)
*G07C 9/00* (2006.01)
*H04L 29/06* (2006.01)
*G05B 19/00* (2006.01)
*G06K 19/00* (2006.01)
*G08B 29/00* (2006.01)
*H04B 1/00* (2006.01)

(52) U.S. Cl.

CPC ..... *G07C 9/00087* (2013.01); *G07C 9/00103* (2013.01); *G07C 9/00563* (2013.01); *G07C 9/00571* (2013.01)

(58) Field of Classification Search

CPC .................................... G05B 1/00; G07C 9/00
USPC ........ 340/5.52, 5.6, 5.7, 5.82, 5.84; 235/449
See application file for complete search history.

(56) References Cited

U.S. PATENT DOCUMENTS 5,903,225 A * 5/1999 Schmitt ............... G07C 9/00111 235/380
5,995,013 A * 11/1999 Yoshizawa ............. B60R 25/24 187/287

(Continued)

OTHER PUBLICATIONS

U.S. Appl. No. 14/641,047 by Ehsan, S. et al. filed Mar. 6, 2015.

*Primary Examiner* — Nam V Nguyen
(74) *Attorney, Agent, or Firm* — Levine Bagade Han LLP

(57) ABSTRACT

Disclosed are an apparatus and method that enables an owner/administrator to manage access to a shared resource based on identity that is established by use of biometric data. For example, access to a shared physical resource can be restricted via use of a biometric locking device. An access management platform can be used to authorize a new user to access the shared resource. Once authorized, the new user can unlock the biometric locking device based on, for example, fingerprint data of his finger. The access management platform can similarly be used to manage access to a virtual shared resource, such as an online account. A virtual locking device, such as a computer that acts as an intermediary between the user and the online account, can be used to restrict access to the online account. The access management platform can enable the user to access the online account based on biometric data.

20 Claims, 25 Drawing Sheets

(56) References Cited

U.S. PATENT DOCUMENTS

| | | | | |
|---|---|---|---|---|
| 6,484,260 | B1 * | 11/2002 | Scott | G06F 21/32 713/182 |
| 6,972,660 | B1 * | 12/2005 | Montgomery, Jr. | G07C 9/00158 340/5.52 |
| 6,980,672 | B2 * | 12/2005 | Saito | G06K 9/00006 340/5.53 |
| 7,242,276 | B2 * | 7/2007 | Usui | G07C 9/00563 340/5.2 |
| 9,058,025 | B2 * | 6/2015 | Huang | G07C 9/00563 |
| 9,425,981 | B2 * | 8/2016 | Foster | H04L 12/2825 |
| 2003/0046540 | A1 * | 3/2003 | Nakamura | B60R 25/25 713/168 |
| 2004/0041690 | A1 * | 3/2004 | Yamagishi | G07C 9/00563 340/5.52 |
| 2005/0179518 | A1 * | 8/2005 | Kawamura | B60R 25/04 340/5.23 |
| 2007/0206838 | A1 * | 9/2007 | Fouquet | G06F 21/32 382/115 |
| 2014/0292481 | A1 * | 10/2014 | Dumas | G07C 9/00111 340/5.61 |
| 2015/0004934 | A1 * | 1/2015 | Qian | H04W 8/22 455/411 |
| 2015/0358315 | A1 * | 12/2015 | Cronin | H04L 63/0861 726/6 |

* cited by examiner

ACCESS MANAGEMENT AND RESOURCE SHARING PLATFORM BASED ON BIOMETRIC IDENTITY

CROSS-REFERENCE TO RELATED APPLICATIONS

This is a non-provisional application filed under 37 C.F.R. §1.53(b), claiming priority under U.S.C. Section 119(e) to U.S. Provisional Patent Application Ser. No. 62/039,822 filed Aug. 20, 2014, the entire disclosure of which is hereby expressly incorporated by reference in its entirety.

BACKGROUND

Many types of resources, such as physical properties/entities, virtual properties/entities, etc., are access controlled. Examples of physical properties/entities include, for example, a house, office, automobile, etc. Examples of virtual properties/entities include, for example, a bank account, investment account, website login ID, credit account, etc.

To manage access to physical properties/entities, proprietors often use physical locks to restrict access to authorized individuals. A proprietor grants an authorized individual access to a physical property/entity, such as a house, car, etc., by providing the authorized individual with a physical key to the lock of the house, car, etc. This may involve going to a lock smith to make a copy of the key in order to have a spare key to provide to the individual.

Further, once an individual has a key, disabling access to the property/entity may be difficult. For example, the individual may lose or refuse to return the key, or may, unknown to the proprietor, make a copy of the key. In such a situation, a proprietor may need to pay a lock smith to re-key the lock in order to eliminate access to an unauthorized possessor of a key.

Similar issues exist for managing access to virtual properties/entities, such as when a party responsible for a credit account wants to authorize another person to access the credit account. For example, a business owner may want to authorize an employee to access his business credit account to purchase supplies for the business. To do this, the business owner may need to apply for and obtain a credit card for the employee, or the business owner may provide his credit card to the employee for the employee to use to purchase the business supplies.

Taking measures such as those described above to enable an authorized individual to access a virtual property/entity, such as enabling the employee to access the business credit account, has inherent complexities and/or risks. Further, these complexities and/or risks increase, in some cases exponentially, as the number of authorized individuals increases.

SUMMARY OF INVENTION

Introduced herein is an access management platform that enables users to manage access to a shared resource, such as a physical (e.g., house, office, car, etc.) or virtual (e.g., bank account, investment account, website, etc.) property/entity, based on biometric data. An access management platform can include a computer system, such as a mobile device, and a mobile/web/etc. application that executes on the computer system. The access management platform can be used to manage access to a shared resource whose access is restricted by a biometric locking device. A user of a biometric locking device can reduce or eliminate the need for a new user to carry a physical key or other account specific authentication tokens in order to access the shared resource. For example, the user can use the access management platform to authorize the new user to lock and/or unlock the biometric locking device based on the biometric data of the new user.

A user can purchase a biometric locking device, and can register as an owner and/or administrator of the biometric locking device. The user can use the biometric locking device to, for example, lock a door of a building in order to restrict access to the building. The biometric locking device can include a biometric data device, such as a fingerprint scanner. The user, such as using his mobile device, can launch a mobile/web/ etc. application that enables the user to authorize a new user to lock and/or unlock the biometric locking device and access the building.

For example, the mobile/web/etc. application can launch a user interface that enables the user to authorize the new user to lock and/or unlock the biometric locking device based on the new user's biometric data. The user can identify the new user and provide contact information of the new user. For example, the user can identify the new user as an authorized user and can provide the new user's email address, mobile phone number, etc., to the mobile/web/etc. application. The mobile/web/etc. application can, based on the contact information, send a message to the new user that includes a digital code, such as an encrypted digital code. The new user can establish his identity with the biometric locking device by sending a message to the biometric locking device that includes the digital code. The biometric lock device can establish the identity of the new user by verifying the digital code. For example, the biometric locking device can verify that the new user is an authorized user of the biometric locking device by verifying the digital code.

The new user can further use a biometric data device to obtain his biometric data and provide the biometric data to the biometric locking device. For example, the new user can use a fingerprint scanner of the biometric locking device, or a fingerprint scanner that is integrated in or coupled to his mobile device, to obtain fingerprint data of his finger. When a fingerprint scanner associated with his mobile device is used, the mobile device can send the fingerprint data to the biometric locking device, such as via a wireless communication standard (e.g., bluetooth, wi-fi, zigbee, etc.).

Upon verification of the digital code and receipt of the biometric data, the biometric locking device can register the new user as an authorized user of the biometric locking device. The biometric locking device and/or the mobile device can send one or more messages to the access management platform that indicates that the identity of the new user has been established with the biometric locking device, that the biometric locking device has received the fingerprint data of the new user, and that the biometric locking device has associated the fingerprint data of the new user with the identity of the new user. For example, the biometric locking device and/or the mobile device of the new user can send a message to the access management platform that indicates that the new user has been registered as an authorized user of the biometric locking device.

Based on registration of the new user as an authorized user, the new user can lock and/or unlock the biometric locking device based on biometric data. For example, the new user can use the fingerprint scanner of the biometric locking device to obtain his fingerprint data. The biometric locking device can verify that the fingerprint data matches fingerprint data of an authorized user, and can, based on the verification, lock and/or unlock the biometric locking device. The biometric locking device can further send a message to the access management platform that indicates that the biometric locking device obtained fingerprint data of the user. The message can further indicate that the biometric locking device was locked and/or unlocked based on the fingerprint data matching the fingerprint data of the authorized user. For example, the biometric locking device can send a message to the access management platform that indicates that the biometric locking device unlocked its locking mechanism based on biometric data of the new user.

BRIEF DESCRIPTION OF DRAWINGS

One or more embodiments are illustrated by way of example in the figures of the accompanying drawings, in which like references indicate similar elements.

DETAILED DESCRIPTION

Figure 1A:
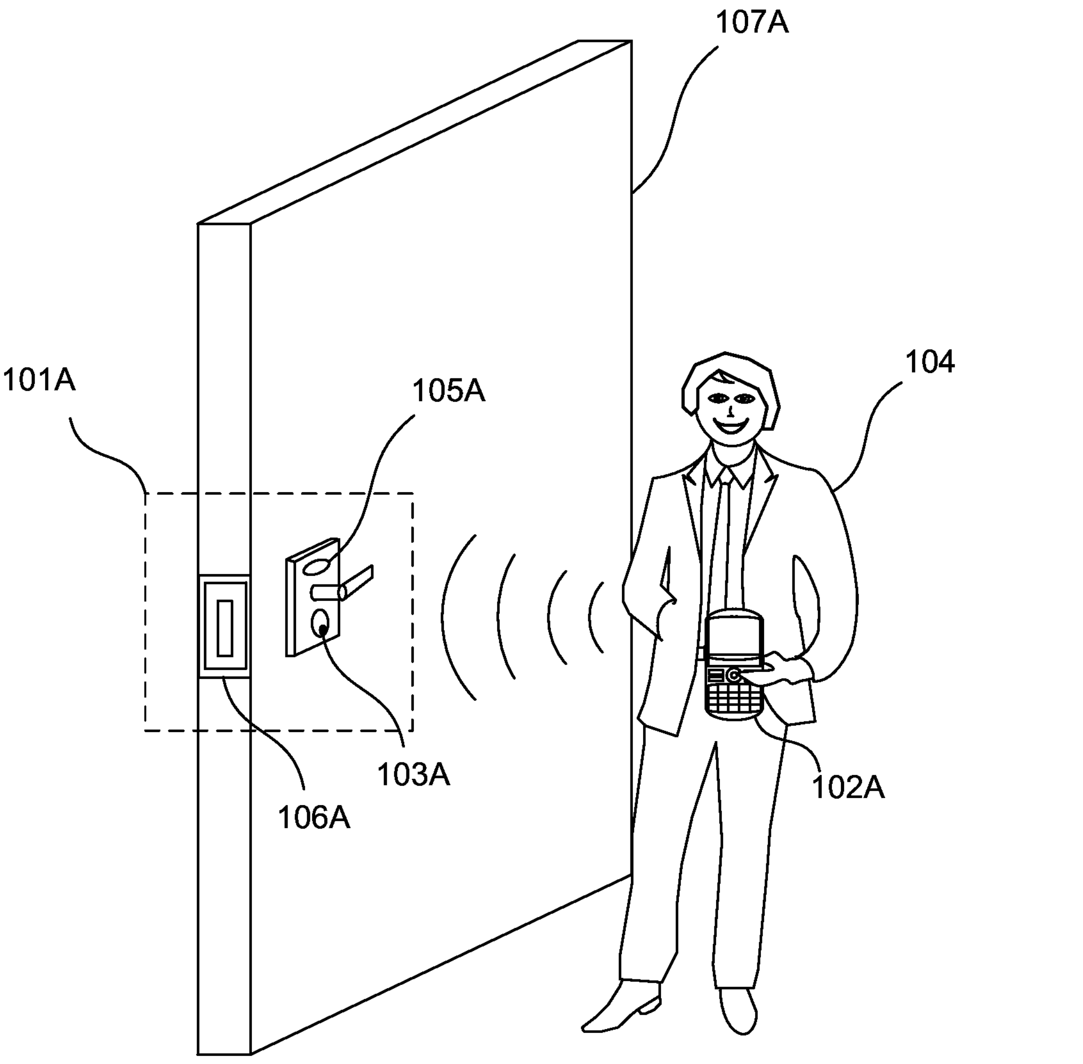
FIGS. 1A and 1B are each an illustration of an environment in which a biometric lock (i.e., a b-lock) is used to restrict access to a door, consistent with various embodiments.

FIG. 1A is an illustration of an environment in which a biometric lock (referred to herein as a "b-lock") is used to restrict access to a door, consistent with various embodiments. The embodiment of FIG. 1A illustrates b-lock 101A, which includes key hole 103A, biometric authentication device 105A, and deadbolt 106A. B-lock 101A is being used to lock door 107A, which is a door of a building, in order to restrict access to the building. In the embodiment of FIG. 1A, biometric data device 105A is a fingerprint scanner. A biometric data device is a device that can obtain biometric data of an individual that can be used to verify the identity of the individual.

Returning to FIG. 1A, b-lock 101A in the embodiment of FIG. 1A can validate a first time user in two ways. Other embodiments of a b-lock can validate a first time user in various other ways. The first method validates an administrator based on a security key obtained with a purchase of a b-lock. When user 104 purchased b-lock 101A, the packaging for b-lock 101A included a security key, which is a string of characters, such as alphanumeric characters or other symbols. User 104 installs a b-lock application on mobile device 102A, which is an Android smart phone in this example, and enters the security key into the b-lock application. User 104 then uses mobile device 102A to wirelessly send a signal to b-lock 101A that includes the security key. Upon receipt and validation of the security key, b-lock 101A allows user 104 to scan his finger using biometric data device 105A, and to register his fingerprint data so that user 104 can be verified to be an administrator of b-lock 101A. Examples of mobile devices include smart phones, tablets, portable media devices, wearable devices, laptops, and other portable computers.

The second method validates an administrator based on a physical key. When user 104 purchased b-lock 101A, the packaging for b-lock 101A included a physical key, which fits in key hole 103A and unlocks b-lock 101A. When user 104A inserts the physical key into key hold 103A and opens b-lock 101A, b-lock 101A allows user 104 to scan his finger using biometric data device 105A, and to register his fingerprint data as the fingerprint data of an administrator of b-lock 101A. In some embodiments, when user 104 installs a b-lock application on mobile device 102A, the b-lock application includes a security key that can be used to establish that user 104 is an administrator of b-lock 101A.

After the fingerprint data of user 104 is registered by b-lock 101A, user 104 no longer needs mobile device 102A, or any other mobile device, to open b-lock 101A. To open b-lock 101A, user 104 simply scans his finger using biometric data device 105A. B-lock 101A determines that his fingerprint data matches the registered fingerprint data of an administrator of b-lock 101A, and opens deadbolt 106A to allow user 104 to open door 107A and enter the building.

Figure 1B:
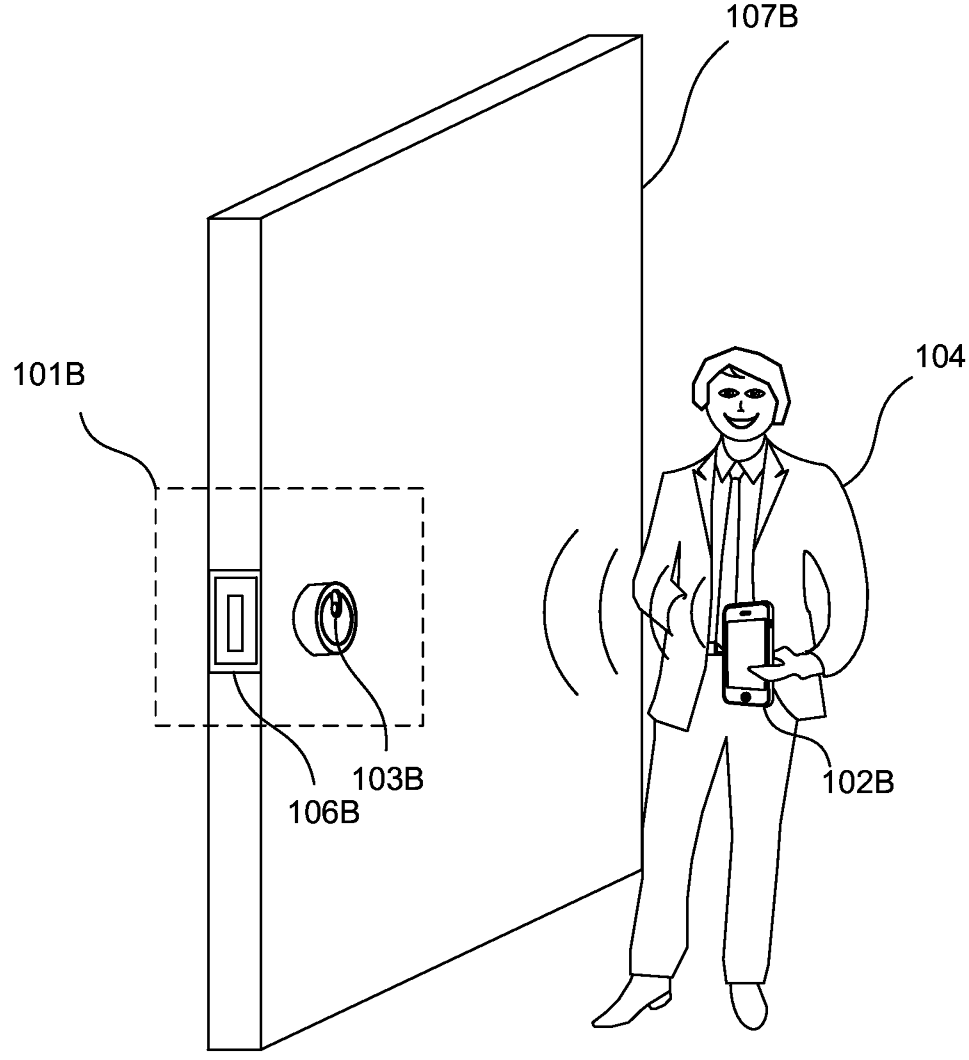

FIG. 1B is an illustration of an environment in which a b-lock is used to restrict access to a door, consistent with various embodiments. The embodiment of FIG. 1B illustrates b-lock 101B, which includes key hole 103B and deadbolt 106B. B-lock 101B is being used to lock door 107B, which is a door of a building, in order to restrict access to the building.

Similar to b-lock 101A, b-lock 101B can validate a first time user in two ways. The first method validates an administrator based on a security key obtained during a purchase of a b-lock. Similar to the process described above for b-lock 101A, user 104 installs a b-lock application on mobile device 102B, which is an iPhone smart phone in this example, and enters a security key that was obtained when the b-lock was purchased into the b-lock application. User 104 then uses mobile device 102B to wirelessly send a signal to b-lock 101B that includes the security key. Upon receipt and validation of the security key, b-lock 101B allows user 104 to scan his finger using a fingerprint scanner of mobile device 102B. The b-lock application wirelessly sends the fingerprint data to b-lock 101B, and b-lock 101B registers the fingerprint data so that user 104 can be verified to be an administrator of b-lock 101B.

The second method validates an administrator based on a physical key. When user 104 purchased b-lock 101B, the packaging for b-lock 101B included a physical key, which fits in key hole 103B and unlocks b-lock 101B. When user 104 inserts the physical key into key hole 103B and opens b-lock 101B, b-lock 101B allows user 104 to scan his finger using a fingerprint scanner of or coupled to mobile device 102B. The b-lock application wirelessly sends the fingerprint data to b-lock 101B, and b-lock 101B registers the fingerprint data so that user 104 can be verified to be an administrator of b-lock 101B.

In some embodiments, b-lock 101B does not include a biometric data device. In these embodiments, a mobile device, such as mobile device 102B, can be used to capture biometric data, such as fingerprint data, and to send the biometric data to b-lock 101B, where b-lock 101B validates the fingerprint data and unlocks deadbolt 106B upon validation of the fingerprint data. In other embodiments, such as the b-lock embodiment of FIGS. 12, 13, and 14, the external facing face plate of b-lock 101B rotates. When in a first position, as is illustrated in FIG. 1B, key hole 103B can be accessed by user 104. When in a second position (not shown), such as when rotated 180 degrees relative to the position of FIG. 1B, the opening of the face plate enables a biometric data device to be accessible. In some of these embodiments, a biometric data device of b-lock 101B can be used to obtain biometric data of user 104, such as fingerprint data of user 104. B-lock 101B can validate the fingerprint data and unlock deadbolt 106B upon validation of the fingerprint data.

Figure 2:
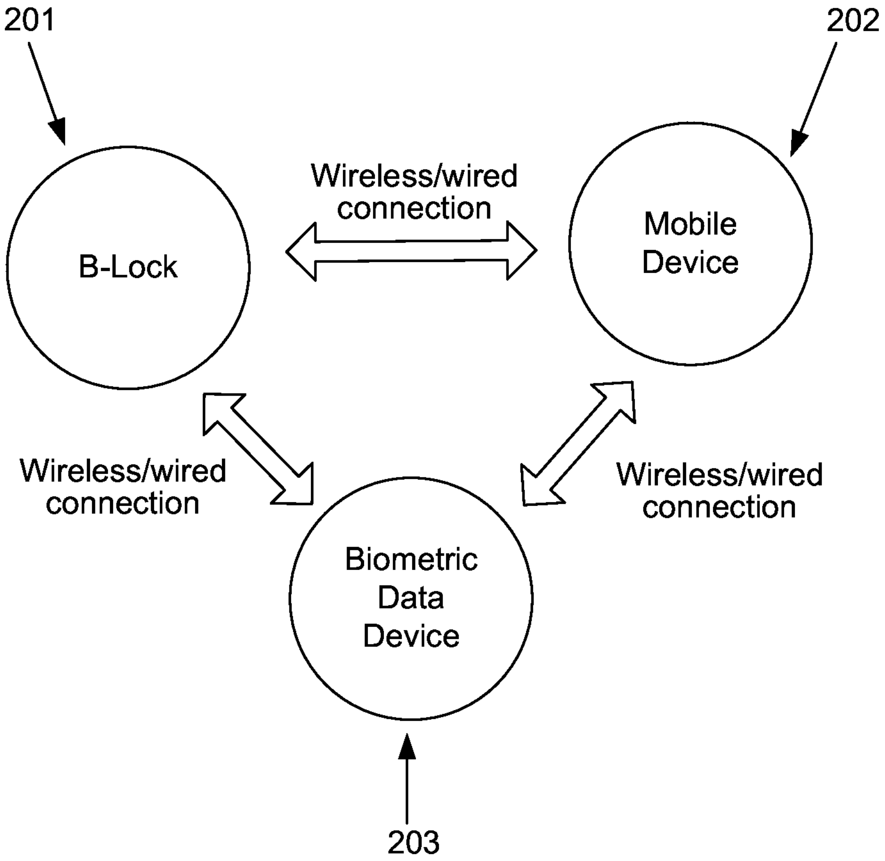
FIG. 2 is a system diagram illustrating a platform that includes a b-lock, a biometric data device, and a mobile device, consistent with various embodiments.

FIG. 2 is a system diagram illustrating a platform that includes a b-lock, a biometric data device, and a mobile device, consistent with various embodiments. B-lock 201 can be, e.g., b-lock 101A of FIG. 1A, b-lock 101B of FIG. 1B, b-lock 301 of FIG. 3, b-lock 601 of FIG. 6, b-lock 1100 of FIG. 11, etc. Mobile device 202 can be, e.g., mobile device 102A of FIG. 1A, mobile device 102B of FIG. 1B, a mobile device executing mobile/web application 602A or 602B of FIG. 6, etc. Biometric data device 203 can be, e.g., biometric data device 105A of FIG. 1A, a biometric data device of or coupled to mobile device 102B, such as a fingerprint scanner of or coupled to mobile device 102B, biometric data device 307 of FIG. 3, biometric data device 607A, 607B, or 607C of FIG. 6, fingerprint scanner 1305 of FIG. 13, etc.

Figure 3:
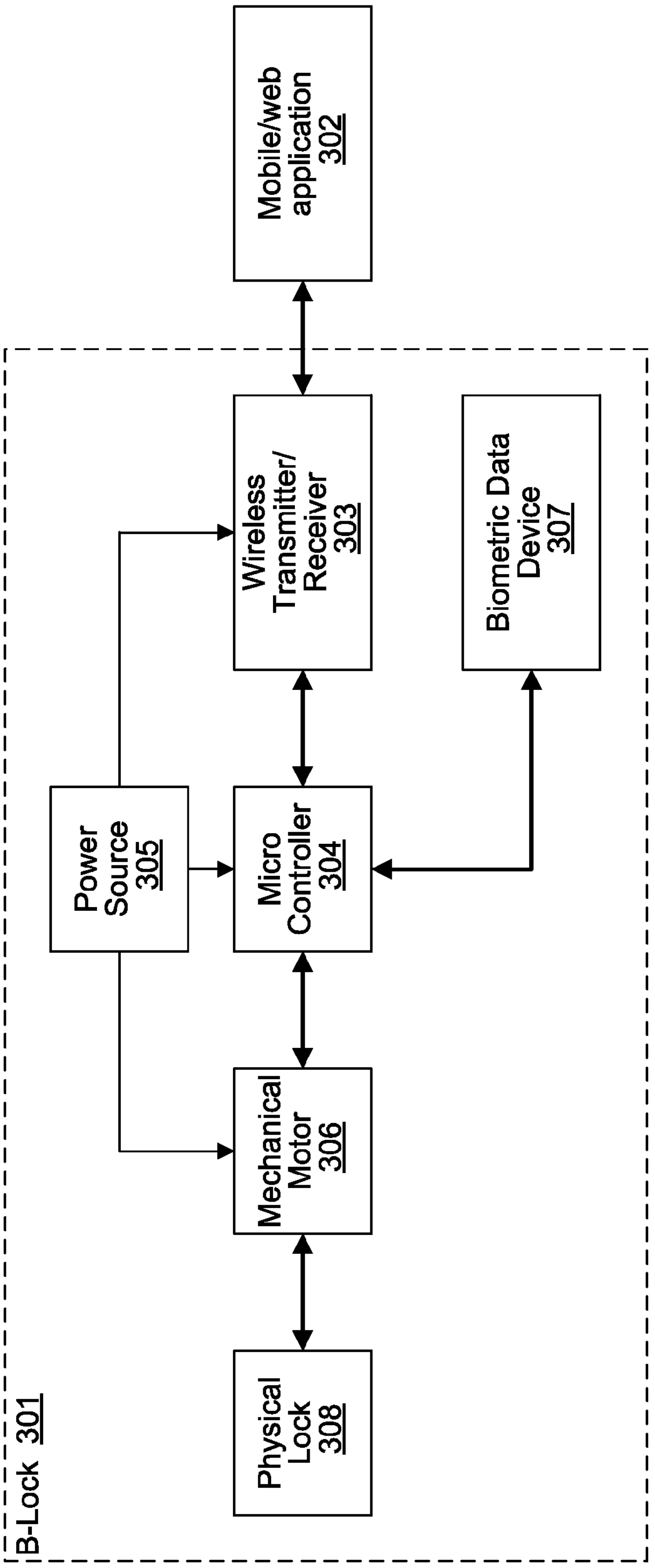
FIG. 3 is a block diagram illustrating an embodiment of a b-lock that includes a biometric data device, consistent with various embodiments.

FIG. 3 is a block diagram illustrating an embodiment of a b-lock that includes a biometric data device, consistent with various embodiments. B-lock 301 of the embodiment of FIG. 3 can be, for example, b-lock 101A of FIG. 1A, b-lock 101B of FIG. 1B, b-lock 601 of FIG. 6, or b-lock 1100 of FIG. 11. B-lock 301 includes physical lock 308. As will be appreciated by a person of ordinary skill in the art, physical lock 308 includes some components that are similar to those of a standard lock for a particular application. For example, a b-lock for a particular application of locking a door of a building can include some components similar to those of a standard lock to lock a door of a building. The components can include, for example, a dead bolt, mechanical parts to cause the dead bolt to move and lock/unlock a door, a key hole/cylinder into which a key can be inserted to lock/unlock a door, etc. As a second example, a b-lock for a particular application of locking a door of a safe can include some components similar to those of a standard lock to lock a door of a safe. The components can include, for example, a combination or security code entry mechanism, multiple dead bolts, each of which extend from the door and enter the door frame of the safe to secure the safe door, mechanical parts to cause the dead bolts to move and lock/unlock the safe door, etc. As a third example, a b-lock for a particular application of locking a door of a car can include some components similar to those of a standard lock to lock a door of a car. The components can include, for example, a latch to latch the car door closed, a key hole/cylinder into which a key can be inserted to lock/unlock the car door, a wireless receiver and a processing unit to receive a wireless signal (that includes a security code), to validate the security code, and to unlock/lock the car door upon validation of the security code, etc.

As discussed above, various embodiments of b-lock 301 can be used to lock any of various doors, such as a door on a building, a door on a car, a door on a safe, a door on a cabinet, etc. B-lock 301 can be unlocked and/or locked based on validation of biometric data, which is obtained by biometric data device 307. Biometric data device 307 is a device that can obtain data of a biometrically identifiable object where the data can be used to identify the biometrically identifiable object. Examples of biometrically identifiable objects include a finger, a hand, an iris, a face, etc. Examples of biometric data devices include a fingerprint scanner, a hand scanner, an iris scanner, a face scanner, a camera, etc. In some embodiments, biometric data device 307 is not integrated in a b-lock, but rather is integrated in or coupled to a mobile device, such as a mobile device that is executing mobile/web application 302.

Biometric data device 307, after obtaining biometric data of a user, can send the biometric data to microcontroller 304. Microcontroller 304 can have a local memory that stores various information, such as security keys, biometric information, access details, logs of user interaction, associated usage timestamps, etc. Microcontroller 304 can keep a record of owner and/or administrator information for b-lock 301. In some embodiments, each b-lock has a single registered owner. In some of these embodiments, in addition to having a single registered owner, each b-lock can have one or more administrators. An owner can authorize a user to be an administrator. Both owners and administrators can authorize a user to be able to unlock/lock a b-lock.

When a new user indicates a request to open b-lock 301 by scanning his fingerprint using biometric data device 307, the request is sent to microcontroller 304. Microcontroller 304 compares biometric data obtained by biometric data device 307 from the new user against registered user data that is stored in local memory, which can be non-volatile memory. If the biometric data matches a registered user that is authorized to open b-lock 301, microcontroller 304 signals mechanical motor 306 to actuate the deadbolt of physical lock 308 in order to open b-lock 301.

Power source 305 provides power to b-lock 301, and can operate on a battery energy source, a wired power outlet, etc. For example, power source 305 can be a rechargeable battery.

B-lock 301 can include light emitting diodes (LEDs), a display, etc. to indicate the lock/unlock status of b-lock 301 to users. Physical lock 308 can include a knob for manually locking/unlocking b-lock 301 that is accessible from the inside of the door on which b-lock 301 is mounted. Physical lock 308 can also include a key hole/cylinder that is accessible from the outside of the door on which b-lock 301 is mounted, and into which a user can insert a physical key to lock/unlock b-lock 301.

In various embodiments, wireless transmitter/receiver 303 can communicate via any of various technologies, such as a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 3G, 4G, etc. The short-range wireless network can also be any of various types, such as Bluetooth, Bluetooth low energy (BLE), near field communication (NFC), etc. The WLAN can similarly be any of various types, such as the various types of IEEE 802.11 networks, among others. In some embodiments, wireless transmitter/receiver 303 can also or alternately communicate via a wired connection, such as via internet protocol (IP) messages sent over a wired Ethernet network. In some embodiments, wireless transmitter/receiver 303 can communicate with a server, such as server 609 of FIG. 6.

Microcontroller 304 can maintain a log of entries and exits and can send the log information via wireless communication facilitated by wireless transmitter/receiver 303 to, for example, a b-lock application running on a mobile device, such as mobile/web application 302. Microcontroller 304 can log when a user opens b-lock 301 with a physical key, and can share this log information with the lock owner and/or administrator(s). Logs of b-lock 301 being locked and/or unlocked through the use of a physical key can, for example, inform the owner of events such as unauthorized access into a space (e.g., a burglary). In some embodiments, a voltage output of mechanical motor 306 is monitored by a circuit of b-lock 301 in order to sense when physical lock 308 is manually locked and/or unlocked using a physical key. In some embodiments, a capacitive/optical sensor of b-lock 301 can track the opening and closing of the door. B-lock 301 can be equipped with other sensors that track vibrations, temperature, etc. B-lock 301 can also be equipped with a display, touch sensors, and/or a camera to enable communication to and/or from users.

Figure 6:
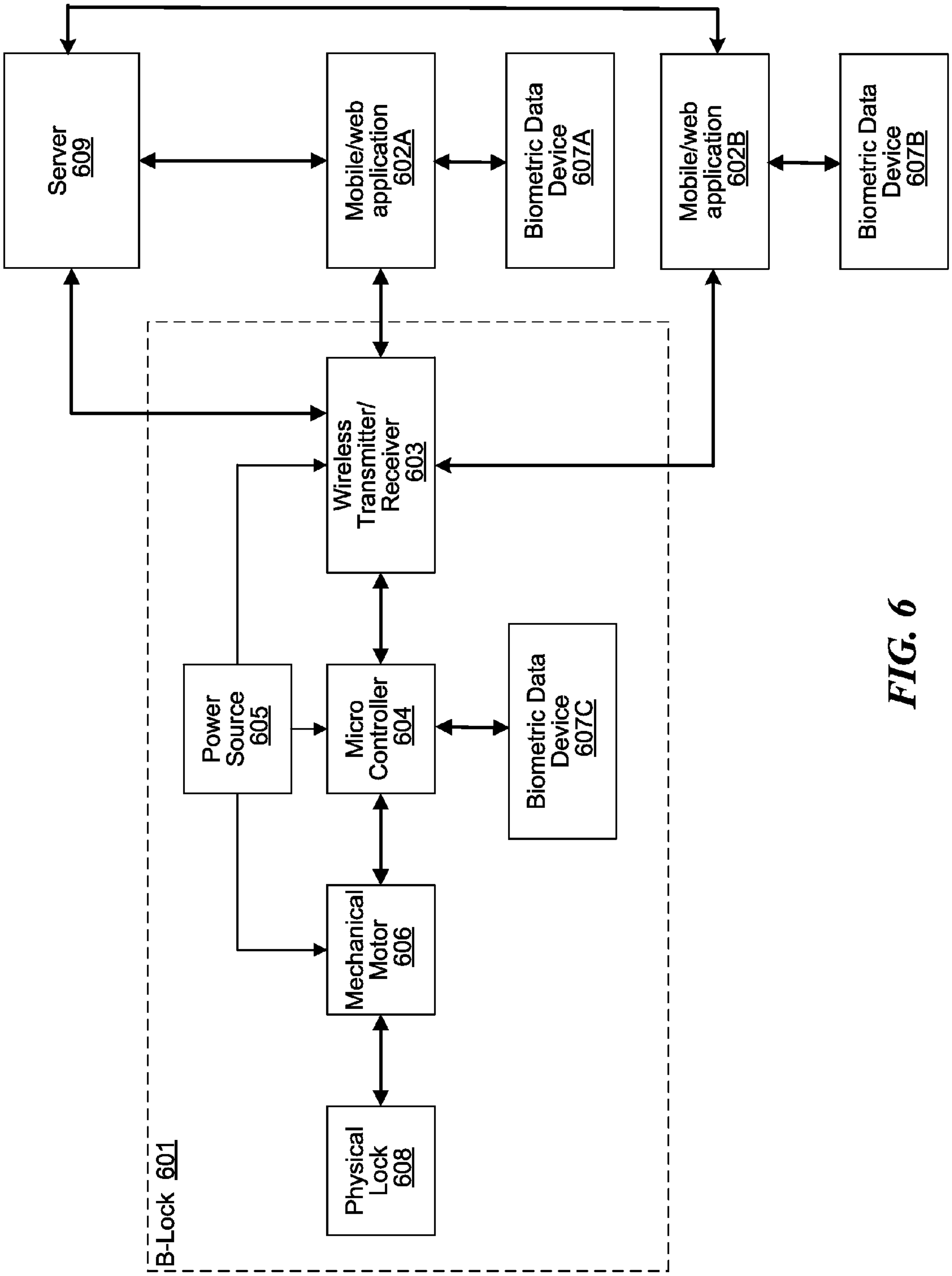
FIG. 6 is a block diagram illustrating an embodiment of a b-lock that communicates with a server, consistent with various embodiments.

In some embodiments, biometric data device 307 can communicate with both microcontroller 304 and mobile/web application 302. Mobile/web application 302 can be a mobile or a web application that runs on, for example, a mobile device such as mobile device 102A of FIG. 1A or mobile device 102B of FIG. 1B. In some embodiments, biometric data device 307 is not part of b-lock 301, but is rather part of or coupled to a mobile device. FIG. 6 provides an block diagram illustrating how a biometric data device, such as biometric data device 607A, can be part of or coupled to a mobile device executing a mobile/web application, such as mobile/web application 602A. Returning to FIG. 3, in some embodiments, biometric data device 307, rather than microcontroller 304, validates the biometric data, such as by comparing the biometric data to stored biometric data of users that are authorized to unlock/lock b-lock 301. The stored biometric data can be stored, for example, in a database. The stored biometric data can reside locally on microcontroller 304, can reside on biometric data device 307, or can reside at another location that is accessible via wireless transmitter/receiver 303. If a user is verified as being authorized to lock/unlock b-lock 301 at the time of the verification, b-lock 301 will lock or unlock the door/gate on which b-lock 301 is mounted.

In some embodiments, mobile/web application 302 can help users of b-lock 301 to organize and manage access to a protected resource, such as a house, a car, a safe, etc. The log information can help inform the owners and/or administrators how the resource is accessed. B-lock 301 can also be applied to an object which has a lock mechanism, but not a door for restricting access to the object, such as a computer or a boat. For example, b-lock 301 can be used as a lock mechanism for the computer or the boat. An owner and/or administrator of b-lock 301 can utilize mobile/web application 302 to authorize an individual to be able to lock/unlock b-lock 301 for any period of time.

Figure 4A:
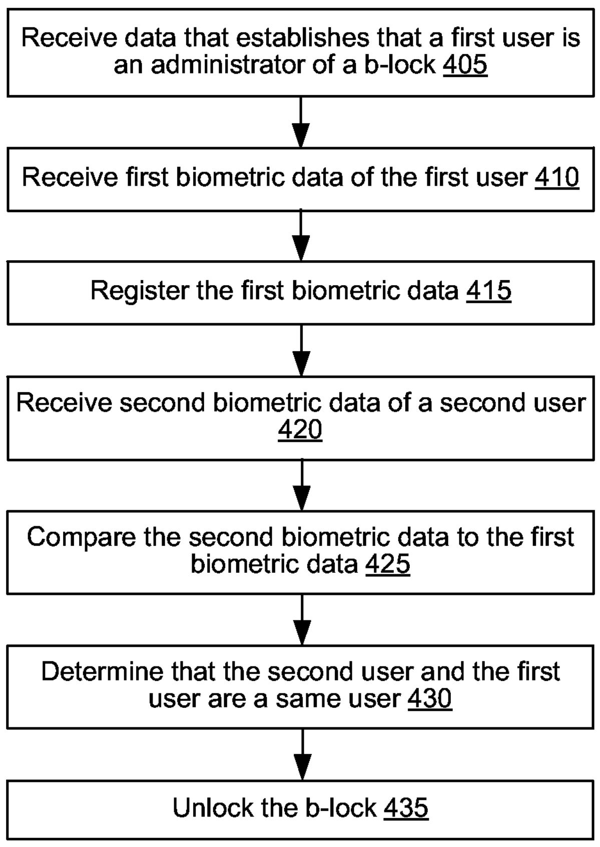
FIG. 4A is a flow diagram illustrating an example process to establish an owner or administrator of a b-lock, consistent with various embodiments.
Figure 11:
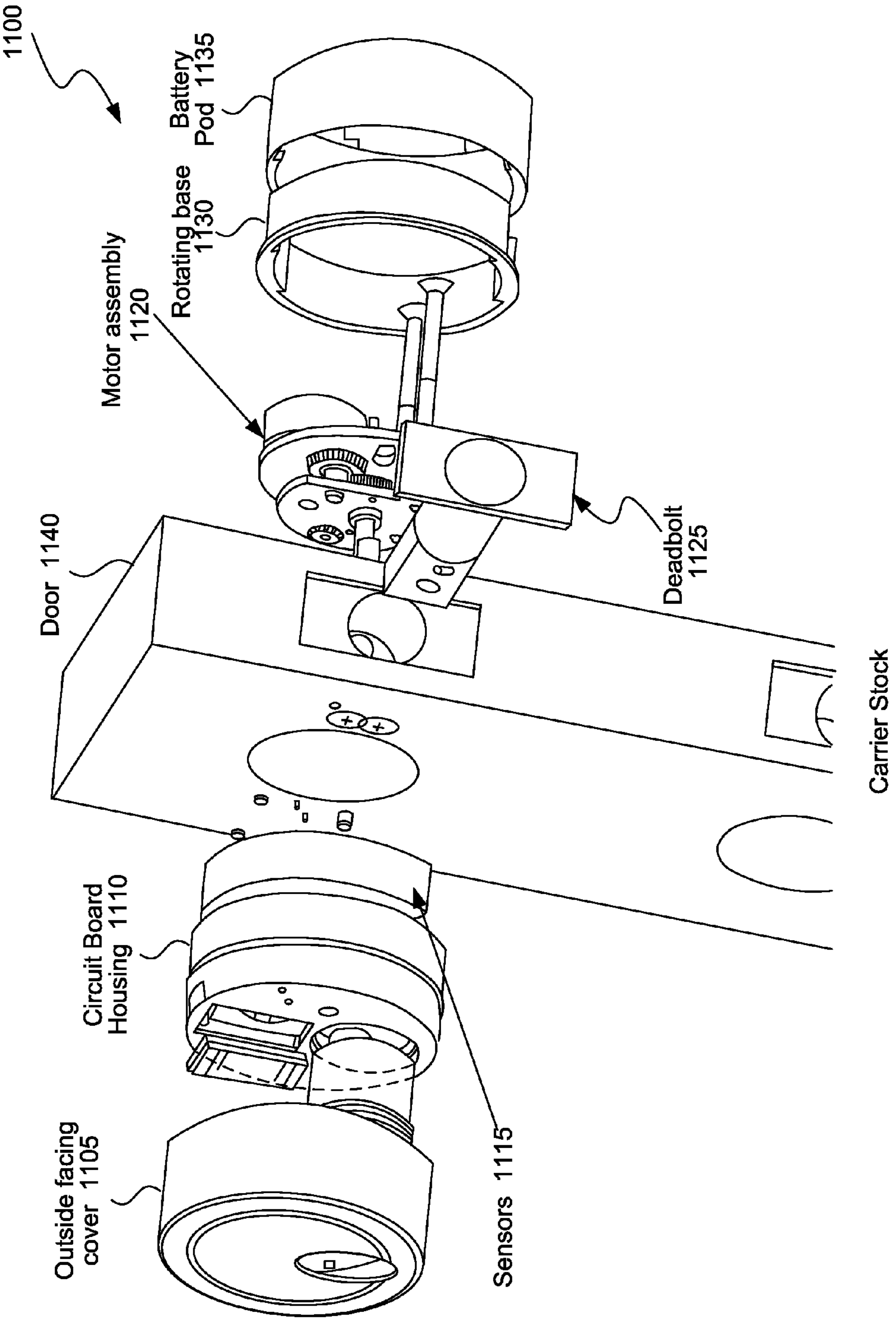
FIG. 11 is an exploded view illustrating the relationship of various components of a b-lock, consistent with various embodiments.

FIG. 4A is a flow diagram illustrating an example process to establish an owner or administrator of a b-lock, such as b-lock 301 of FIG. 3, b-lock 601 of FIG. 6, or b-lock 1100 of FIG. 11, consistent with various embodiments. To facilitate locking or unlocking a b-lock based on biometric data, an owner or administrator of the b-lock can be established. The b-lock receives data that establishes that a user is an owner or administrator of the b-lock (step 405). For example, b-lock 301 can receive the data via wireless transmitter/receiver 303. Any of a variety of methods can be utilized to establish that a user is an owner or administrator of a b-lock. In a first example, a security code that is unique to a particular b-lock is delivered to a user in association with a purchase of the b-lock by the user, such as via product packaging or via registering the b-lock at a website. When the security key is delivered via product packaging, the user, for example, obtains a document from the package that contains the security key. When the security key is delivered via a website, the user inputs a string, such as an alphanumeric string that contains the serial number of the b-lock, at the website, such as by use of a desktop computer. The website can display the security key or send the security key to the user, such as via email or text message.

Once the user has the security key, the user can use the security key to establish that he is an owner or administrator of the b-lock in any of several ways. For example, the user can download from a website and install on a mobile device a b-lock application, which is an application associated with the b-lock. A mobile device, such as mobile device 102A or 102B, can download and install a b-lock application, such as mobile/web application 302. The user can launch the b-lock application, and can input the security code via the b-lock application. In some embodiments, when the b-lock application is installed on the mobile device, the b-lock application includes a security key.

The b-lock application can communicate with the b-lock either wirelessly or via a wired connection, and can send the security key to the b-lock. For example, mobile device 102A of FIG. 1A or 102B of FIG. 1B can send the security key to b-lock 301 of FIG. 3 via a wireless or wired connection with wireless transmitter/receiver 303. The security key can be sent via an encrypted message, and b-lock 301, such as via microcontroller 304, can unencrypt the message to obtain the unencrypted security key. B-lock 301 can include non-volatile storage, such as a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of non-volatile storage. B-lock 301, such as via microcontroller 304, can access security key related data from the non-volatile storage, and can use the security key related data to verify that the security key is valid for b-lock 301. Upon validation of the security key, b-lock 301 establishes that the user is an administrator or owner of b-lock 301.

As another example of using the security key to establish that a user is an owner or administrator of b-lock 301, the security key can be input at b-lock 301. B-lock 301 can include an input mechanism, such as a keypad, voice recognition, or other input capability, and the user can input the security key using the input mechanism, which can be sent to microcontroller 304. B-lock 301, such as via microcontroller 304, can access security key related data from non-volatile storage, and can use the security key related data to verify that the security key is valid for b-lock 301. Upon validation of the security key, b-lock 301 establishes that the user is an administrator or owner of b-lock 301.

A second example of a method to establish that a user is an administrator of a b-lock uses a physical key that is keyed to a particular b-lock. The user can use the physical key to establish that he is an owner or administrator of the b-lock by using the key to unlock b-lock 301. Microcontroller 304 determines that b-lock 301 has been unlocked by use of a physical key, and, accordingly, establishes that the user is an administrator or owner of b-lock 301.

Once a b-lock establishes that a user is an administrator or owner of the b-lock, the biometric data of the user is registered. The biometric data can be obtained in any of various ways. In embodiments where a b-lock, such as b-lock 301, includes a biometric data device, such as biometric data device 307, the biometric data device can be used to obtain biometric data of the user. In some embodiments, such as the embodiment of FIG. 6, a biometric data device of or coupled to a mobile device, such as biometric data device 607A or 607B, which can be integrated in or coupled to a mobile device that is executing, respectively, mobile/web application 602A or 602B, can be used to obtain biometric data of the user. B-lock 301 can receive the biometric data of the user (step 410), and can register the biometric data (step 415). Registering biometric data includes storing the data or a representation of the data in memory, such as non-volatile storage, and associating the biometric data with a role or permission related to b-lock 301. For example, b-lock 301 can receive fingerprint data of a user who has been established to be an administrator or owner of b-lock 301. B-lock 301 can store the biometric data in memory, and can associate the biometric data with an owner role, an administrator role, with b-lock related permissions, etc. An owner or administrator can be, for example, authorized to unlock or lock b-lock 301 at any time.

At a later point in time, a second user attempts to unlock b-lock 301. The second user uses a biometric data device to obtain second biometric data, which is the second user's biometric data. The second user uses, for example, biometric data device 307 or a biometric data device of or coupled to a mobile device of the second user to obtain second biometric data. Biometric data device 307 or the mobile device of the second user send the biometric data to b-lock 301, where the biometric data is received (step 420). At step 425, b-lock 301, such as via microcontroller 304, compares the second biometric data to the biometric data of step 415 to determine whether the second user is an owner or administrator of b-lock 301. At step 430, b-lock 301 determines that the second user and the user of step 405 are a same user, and accordingly also determines that the second user is an owner or administrator of b-lock 301. Based on the validation that the second user is an owner or administrator of b-lock 301, b-lock 301 unlocks the locking mechanism of physical lock 308 (step 435), such as by microcontroller 304 sending a signal to mechanical motor 306 to cause mechanical motor 306 to unlock b-lock 301.

Figure 4B:
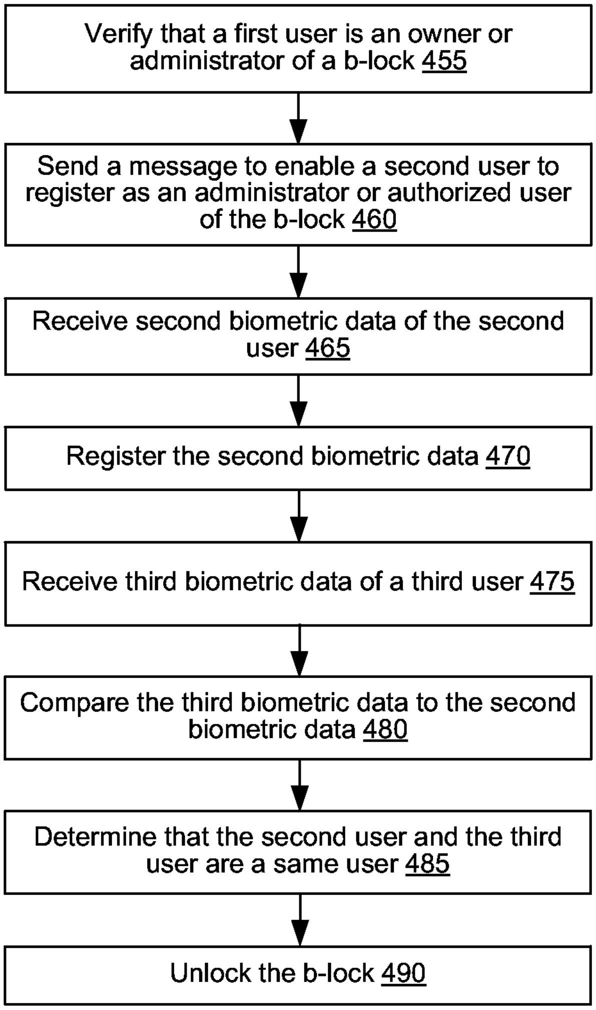
FIG. 4B is a flow diagram illustrating an example process to add an administrator or an authorized user of a b-lock, consistent with various embodiments.

FIG. 4B is a flow diagram illustrating an example process to add an administrator or an authorized user of a b-lock, such as b-lock 301 of FIG. 3, b-lock 601 of FIG. 6, or b-lock 1100 of FIG. 11, consistent with various embodiments. To facilitate adding an administrator or an authorized user of a b-lock, the b-lock can initially have an owner or administrator established, such as via the process of FIG. 4A. The owner or administrator can authorize an addition of an authorized user or an additional administrator.

A b-lock, such as b-lock 301 of FIG. 3, verifies that a user is an owner or administrator of a b-lock, such as b-lock 301 (step 455). This verification can be accomplished in any of various ways. For example, when the user is established to be an administrator or owner of the b-lock, such as at step 405 of FIG. 4A, b-lock 301 of FIG. 3, or another device, can send first security data to a mobile device of the user to enable the mobile device to be identifiable. Messages sent by the mobile device to b-lock 301 can include second security data that enables b-lock 301 to verify that the message is from the mobile device of the user. The second security data can be verified to be the same as, derived from, associated with, etc. the first security data. Once the identity of the mobile device is established via validation of the second security data, and the second security data is validated to be associated with an owner or administrator of b-lock 301, any messages sent from the mobile device can be validated as being from an owner or administrator of b-lock 301.

Once the user is validated to be an owner or administrator of b-lock 301, the user can initiate a process to add a new administrator or authorized user. An administrator is able to manage a b-lock, for example, by adding or deleting authorized users or other administrators. In some embodiments, only an owner can change roles/permissions of an administrator, such as adding a new administrator or deleting an existing administrator. The user can enable a second user to register as an administrator or an authorized user of b-lock 301 by causing b-lock 301 or mobile/web application 302 to send a message to the second user. For example, the user can use a b-lock application running on his mobile device to add a second user. The user can enter any of the email address, mobile phone number, etc. of the second user, and the b-lock application can send a message that includes a security key to the second user via email, text, etc. The security key can be recognized by b-lock 301 as granting administrator or authorized user permissions to the second user. The second user, such as by running a b-lock application that has access to the security key on his mobile device, or by logging into a website into which the security key can be input, can cause the security key to be sent to b-lock 301. B-lock 301 can validate the security key and, based on the security key, determine that the second user has administrator or authorized used permissions.

At step 465, which is similar to step 410 of FIG. 1A, B-lock 301 receives the biometric data of the second user, and registers the biometric data (step 470, which is similar to step 415). At a later point in time, a third user attempts to unlock b-lock 301. The third user uses a biometric data device to obtain third biometric data, which is the third user's biometric data. The third user uses, for example, biometric data device 307, or a biometric data device of or coupled to a mobile device of the third user, to obtain third biometric data. Biometric data device 307 or the mobile device send the biometric data to b-lock 301, where the biometric data is received (step 475, which is similar to step 420). At step 480, which is similar to step 425, b-lock 301, such as via microcontroller 304, compares the third biometric data to the biometric data of step 470 to determine whether the second user is an administrator or authorized user of b-lock 301. At step 485, which is similar to step 430, b-lock 301 determines that the third user and the user of step 470 are the same user. Based on the validation that the third user is an administrator or authorized user of b-lock 301, b-lock 301 unlocks the locking mechanism of physical lock 308 (step 490, which is similar to step 435).

Figure 5:
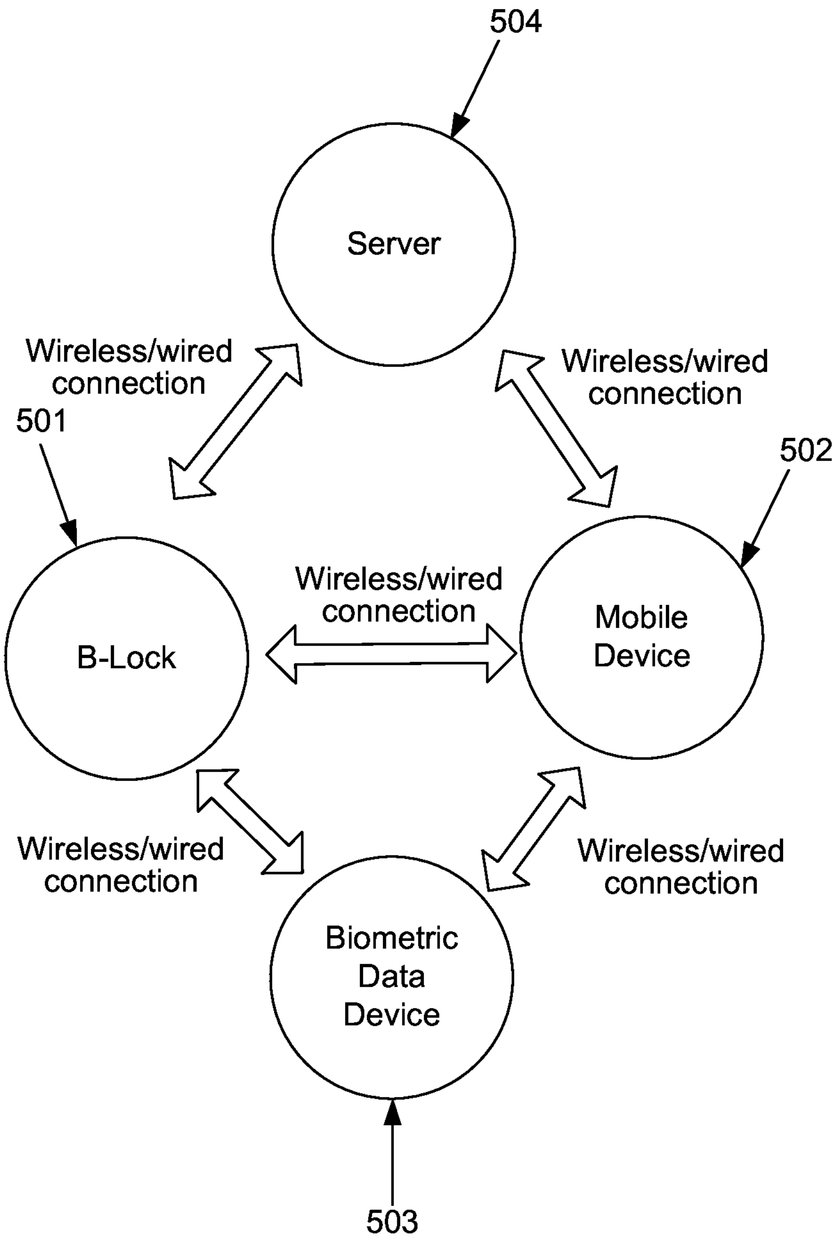
FIG. 5 is a system diagram illustrating a platform that includes a b-lock, a biometric data device, a mobile device, and a server, consistent with various embodiments.

FIG. 5 is a system diagram illustrating a platform that includes a b-lock, a biometric data device, a mobile device, and a server, consistent with various embodiments. B-lock 501 can be, e.g., b-lock 101A of FIG. 1A, b-lock 101B of FIG. 1B, b-lock 301 of FIG. 3, b-lock 601 of FIG. 6, b-lock 1100 of FIG. 11, etc. Mobile device 502 can be, e.g., mobile device 102A of FIG. 1A, mobile device 102B of FIG. 1B, a mobile device executing mobile/web application 602A or 602B, etc. Biometric data device 503 can be, e.g., biometric data device 105A of FIG. 1A, a biometric data device of or coupled to mobile device 102B, biometric data device 307 of FIG. 3, biometric data device 607A, 607B, or 607C of FIG. 6, fingerprint scanner 1305 of FIG. 13, etc. Server 504 can be, e.g., server 609 of FIG. 6, etc. The platform of FIG. 5 can be used, for example, to manage access to physical (e.g., house, office, car, etc.) or virtual (e.g., bank account, website, etc.) properties based on biometric data. The platform can use biometric data to eliminate the need for users to carry, for example, physical keys, account specific authentication tokens, etc.

FIG. 6 is a block diagram illustrating an embodiment of a b-lock that communicates with a server, consistent with various embodiments. B-lock 601, wireless transmitter/receiver 603, microcontroller 604, power source 605, mechanical motor 606, and physical lock 608 are, respectively, substantially similar to b-lock 301, wireless transmitter/receiver 303, microcontroller 304, power source 305, mechanical motor 306, and physical lock 308 of FIG. 3. In some embodiments, b-lock 601 includes a biometric data device, such as biometric data device 607C, while in other embodiments, b-lock 601 does not include a biometric data device. In some embodiments, regardless as to whether a b-lock includes a biometric data device, biometric data of a user can be obtained by a remote device, such as a biometric data device that is part of or coupled to a mobile device.

For example, in some embodiments, regardless as to whether b-lock 601 includes biometric data device 607C, biometric data of a user can be obtained by biometric data device 607A or 607B that is part of or coupled to, respectively, a first mobile device that is executing mobile/web application 602A or a second mobile device that is executing mobile/web application 602B. Either mobile/web application 602A or 602B can send the biometric data to b-lock 601. For example, mobile/web application 602A or 602B can send the biometric data to wireless transmitter/receiver 603, which can relay the biometric data to microcontroller 604. Further, b-lock 601 can communicate with server 609 via wireless transmitter/receiver 603.

In some embodiments, server 609 is a cloud server. For example, server 609 can be a server that is a shared cloud computing resource. In some embodiments, server 609, or any computing device that can communicate with other computing devices via a network, can store data using cloud storage. For example, server 609 can store data using storage that is part of a shared could computing resource.

Figure 7A:
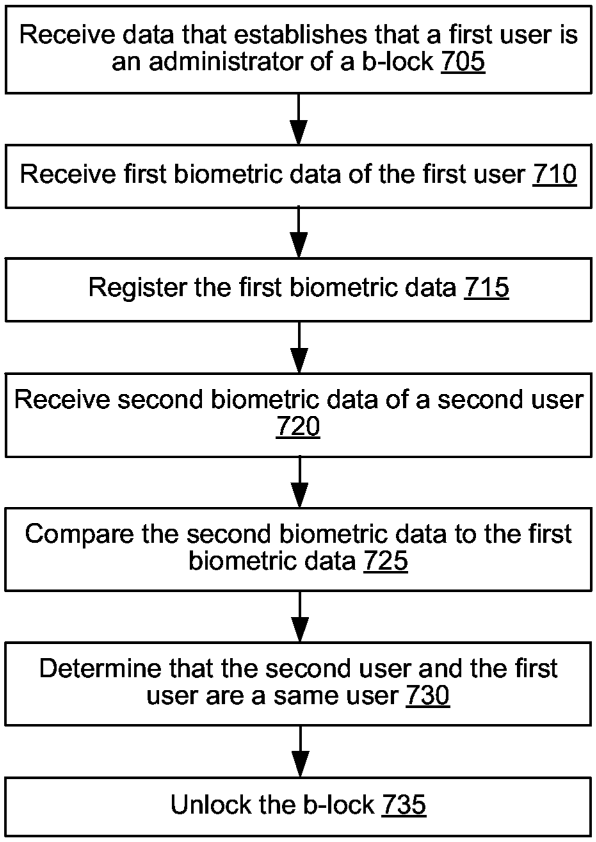
FIG. 7A is a flow diagram illustrating an example process, that involves a server, to establish an owner or administrator of a b-lock, consistent with various embodiments.

FIG. 7A is a flow diagram illustrating an example process, that involves a server, to establish an owner or administrator of a b-lock, such as b-lock 301 of FIG. 3, b-lock 601 of FIG. 6, or b-lock 1100 of FIG. 11, consistent with various embodiments. To facilitate locking or unlocking a b-lock based on biometric data, an owner or administrator of the b-lock can be established. A server, such as server 609, receives data that establishes that a user is an administrator of the b-lock (step 705). As is discussed above in the description of FIG. 4A, any of a variety of methods can be utilized to establish that a user is an administrator of a b-lock, and to enable the user to obtain a security key for the b-lock.

As is discussed above in the description of FIG. 4A, once the user has the security key, the user can use the security key to establish that he is an owner or administrator of the b-lock in any of several ways. For example, the user can download from a website and install on a mobile device a b-lock application. A mobile device, such as mobile device 102A or 102B, can download and install mobile/web application 602A, which can be a b-lock application. The user can launch the b-lock application, and can input the security code via the b-lock application. The b-lock application can communicate with the server either wirelessly or via a wired connection, and can send the security key to the server. For example, mobile device 102A of FIG. 1A or 102B of FIG. 1B can send the security key to server 609. Server 609 can include non-volatile storage, such as a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of non-volatile storage. Server 609 can access security key related data from the non-volatile storage, and can use the security key related data to verify that the received security key is valid for b-lock 601. Upon validation of the security key, server 609 establishes that the user is an administrator or owner of b-lock 601.

Once a server establishes that a user is an administrator or owner of a b-lock, the biometric data of the user is registered. As is discussed above in the description of FIG. 4A, the biometric data can be obtained in any of various ways. In the embodiment of FIG. 7A, the user uses biometric data device 607A, which is part of or coupled to a mobile device that is running mobile/web application 602A, to obtain biometric data of the user. Server 609 can receive the biometric data of the user (step 710), and can register the biometric data (step 715). Registering biometric data includes storing the data or a representation of the data in memory, such as non-volatile storage, and associating the biometric data with a role or permission related to b-lock 601. For example, server 609 can receive fingerprint data of a user who has been established to be an administrator or owner of b-lock 601. Server 609 can store the biometric data in memory, and can associate the biometric data with an owner or administrator role, can associate the biometric data with b-lock 601 related permissions, etc.

At a later point in time, a second user attempts to unlock b-lock 601. The second user uses a biometric data device to obtain second biometric data, which is the second user's biometric data. The second user uses, for example, biometric data device 607B, which is part of or coupled to a mobile device executing mobile/web application 602B, to obtain the second biometric data. Biometric data device 607B sends the second biometric data to mobile/web application 602B, which in turn sends the biometric data to server 609, where the biometric data is received (step 720). At step 725, server 609 compares the second biometric data to the biometric data of step 715 to determine whether the second user is an owner or administrator of b-lock 601. At step 730, server 609 determines that the second user and the user of step 705 are a same user, and accordingly also determines that the second user is an owner or administrator of b-lock 601. Based on the validation that the second user is an owner or administrator of b-lock 601, which can be communicated to b-lock 601 by server 609 when server 609 accomplishes the validation, b-lock 601 unlocks the locking mechanism of physical lock 608 (step 735), such as by microcontroller 604 sending a signal to mechanical motor 606 to cause mechanical motor 606 to unlock b-lock 601.

Figure 7B:
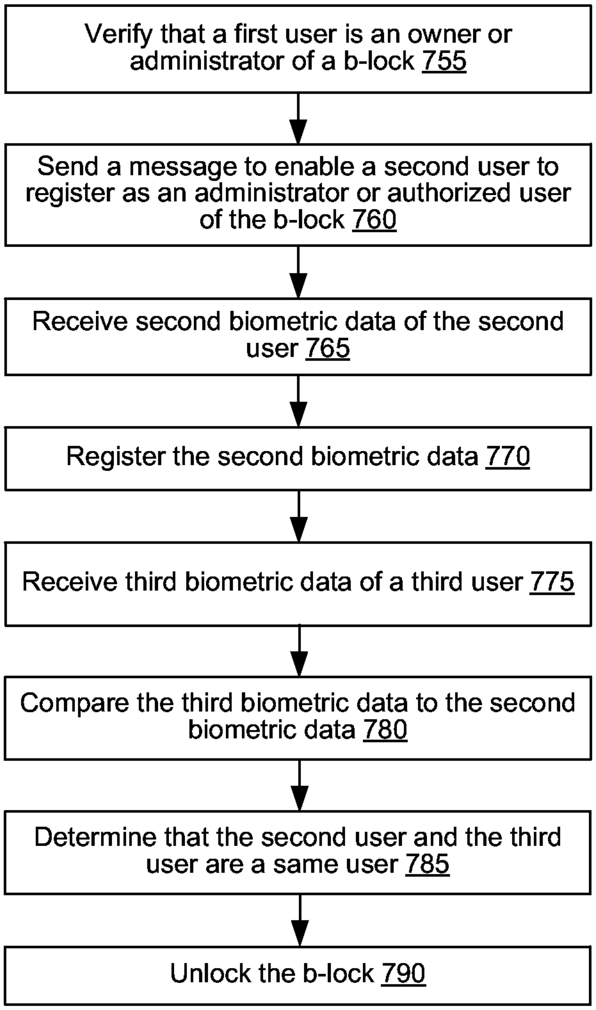
FIG. 7B is a flow diagram illustrating an example process, that includes a server, to add an administrator or an authorized user of a b-lock, consistent with various embodiments.

FIG. 7B is a flow diagram illustrating an example process, that includes a server, to add an administrator or an authorized user of a b-lock, such as b-lock 301 of FIG. 3, b-lock 601 of FIG. 6, or b-lock 1100 of FIG. 11, consistent with various embodiments. To facilitate adding an administrator or an authorized user of a b-lock, the b-lock can initially have an owner or administrator established, such as via the process of FIG. 7A. The owner or administrator can authorize an addition of an authorized user or an additional administrator.

A server, such as server 609 of FIG. 6, verifies that a user is an owner or administrator of a b-lock, such as b-lock 601 (step 755). As is discussed above in the description of FIG. 4B, this verification can be accomplished in any of various ways. For example, when the user is established to be an administrator or owner of the b-lock, such as at step 705 of FIG. 7A, server 609 of FIG. 6 can send first security data to a mobile device of the user, such as a mobile device running mobile/web application 602A, to enable the mobile device to be uniquely identifiable. Messages sent by the mobile device to b-lock 601 or server 609 can include second security data that enables b-lock 601 or server 609 to verify that the message is from the mobile device of the user. The second security data can be the same as the first security data, can be generated based on the first security data, etc. Once the identity of the mobile device is established via validation of the second security data, and the second security data is validated to be associated with an owner or administrator of b-lock 601, any messages sent from the mobile device can be validated as being from an owner or administrator of b-lock 601.

As a second example, server 609 can have access to a list of owners and/or administrators for b-lock 601. Each user, including each owner and/or administrator, can have an account at server 609, with the user's status as an owner or administrator of b-lock 601 being available via the account profile. When the user logs into the account, server 609 can verify that the user is an owner or administrator of b-lock 601 via the user's account profile.

Once the user is validated to be an owner or administrator, the user can initiate a process to add a new administrator or authorized user. An administrator is able to manage a b-lock, for example, by adding or deleting authorized users or other administrators. The user can enable a second user to register as an administrator or an authorized user of b-lock 601 by causing server 609 send a message to the second user. For example, the user can use a b-lock application running on his mobile device to add a second user. The user can enter the email address, mobile phone number, etc. of the second user, and the b-lock application can send a message that includes a security key to the second user via email, text, etc. The security key can be recognized by b-lock 601 or server 609 as granting administrator or authorized user permissions to the second user. The second user, such as by running a b-lock application that has access to the security key on his mobile device, or by logging into a website into which the security key can be input, can cause the security key to be sent to b-lock 601 or server 609. B-lock 601 or server 609 can validate the security key and, based on the security key, recognize that the security key grants administrator or authorized used rights to the second user.

At step 765, which is similar to step 710 of FIG. 7A, server 609 can receive the biometric data of the second user, and can register the biometric data (step 770, which is similar to step 715). At a later time, a third user attempts to unlock b-lock 601. The third user uses a biometric data device to obtain third biometric data, which is the third user's biometric data. The third user uses, for example, biometric data device 607B to obtain third biometric data. Biometric data device 607B sends the biometric data to mobile/web application 602B, which in turn sends the biometric data to server 609, where the biometric data is received (step 775, which is similar to step 720). At step 780, which is similar to step 725, server 609 compares the third biometric data to the biometric data of step 770 to determine whether the second user is an administrator or authorized user of b-lock 601. At step 785, which is similar to step 730, server 609 determines that the third user and the user of step 770 are a same user. Based on the validation that the third user is an administrator or authorized user of b-lock 601, which can be communicated to b-lock 601 by server 609 when server 609 accomplishes the validation, b-lock 601 unlocks the locking mechanism of physical lock 608 (step 790, which is similar to step 735).

Figure 8A:
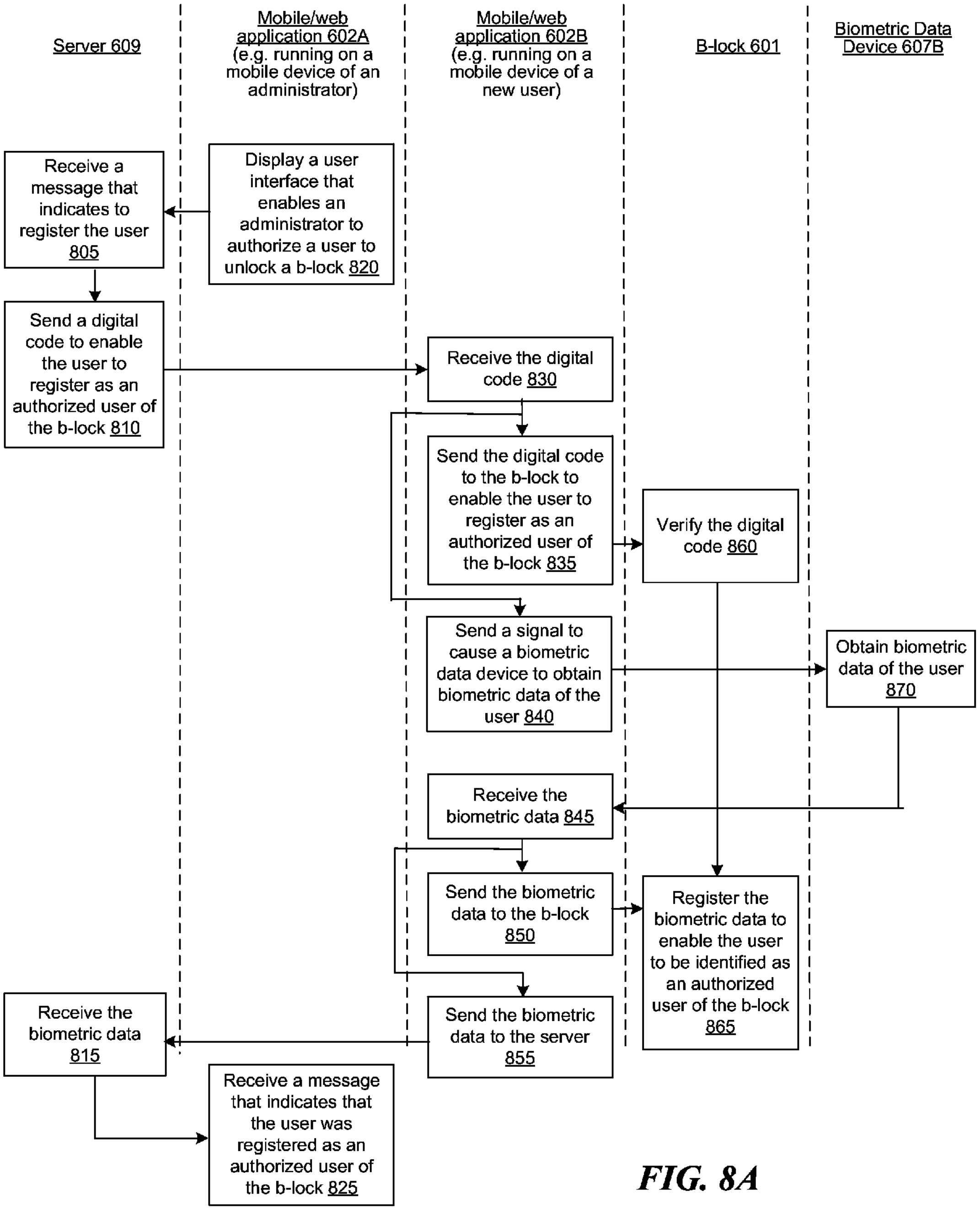
FIGS. 8A and 8B are activity diagrams each illustrating a different example process for managing access to a physical property with access controlled by a b-lock, consistent with various embodiments.

FIG. 8A is an activity diagram illustrating an example process for managing access to a physical property with access controlled by a b-lock, consistent with various embodiments. The description of the example process of FIG. 8A will refer to the embodiment and labels of FIG. 6. Using, for example, the process of FIG. 7A, a user who is a purchaser of a b-lock can register himself as an owner and/or administrator of the b-lock. The user can download a b-lock application, such as mobile/web application 602A, on his mobile device and can execute the b-lock application. The b-lock application can display a user interface that enables an administrator, such as the user, to authorize a new user to unlock a b-lock, such as b-lock 601 (step 820). To authorize the new user to unlock the b-lock, the new user can be registered as an authorized user. An authorized user is a user that is authorized to unlock or lock a b-lock during one or more periods of time.

For example, an authorized user can be authorized to lock and/or unlock a b-lock at any time, Monday through Friday from 9:00 am to 5:00 pm, on the first Monday of every month, today from 4:00 pm to 6:00 pm, at any time between noon today to noon one week from today, etc. Once registered as an authorized user, the authorized user can lock and/or unlock the b-lock during the period(s) of time that he is authorized to lock and/or unlock the b-lock.

Being able to grant access to a physical property without having to provide any physical item, such as a physical key, is useful to a variety of people who want to grant access to a physical property. Such an ability can be useful to, for example, a property owner who rents his house using an online lodging website, an apartment dweller who wants to enable a cleaning person to enter his house when a cleaning is scheduled, a car owner who wants to lend his car to his friend for a period of time, etc. In each of these cases, rather than having to deliver a physical key to the renter, cleaning person, or friend, the access granting person can authorize the renter, cleaning person, or friend to be able to lock and unlock the b-lock during the desired period of time. For example, the property owner can authorize the renter to be able to lock and unlock the b-lock on the door of the house during the period of time that the renter rents the house. The apartment dweller can authorize the cleaning person to be able to lock and unlock the b-lock on the door of his apartment during the scheduled cleaning time. The car owner can authorize his friend to be able to lock and unlock the door of the car during the period of time that he has decided to loan the car to his friend. Another embodiment of a b-lock can be used to enable the friend to be able to start the car during the period of time that the car owner wants to loan the car to the friend.

The user can use the user interface to manage access to a physical property or object with access controlled by a b-lock. Using a user interface of an application, such as interface 900 of FIG. 9 which is a user interface of mobile/web application 602A, a user can manage access to physical properties, such as his home, a storage facility, his office, his car, etc. Interface 900 can be an interface to a resource management platform for managing access to shared resources. To manage access to his home, which in this example has access controlled by b-lock 601, the user can touch the "Manage" icon of user interface 900 that is associated with his home. A second level user interface is displayed to enable the user to input contact information for a new user that he wants to grant access to his home. The user can input, for example, an email address, a phone number of a mobile device, an IP address, etc. of the new user. Mobile/web application 602A sends a message that indicates a request to register the new user as an authorized user of b-lock 601 to a server, such as server 609 (step 805). The message can include contact information of the new user, as well as an indication of one or more periods of time when the new user is authorized to lock and/or unlock b-lock 601.

Server 609 verifies that the message is from an administrator of b-lock 601, and, based on the verification, sends a digital code to the new user to enable the user to register as an authorized user of b-lock 601. The digital code can include, for example, an encrypted security key. The digital code can be sent via an email to the email address of the new user, via a text message to the phone number of the new user, via a message sent to an IP address of the new user, etc. Once the digital code is received by the new user, mobile/web application 602B can obtain the digital code and can obtain the security key (step 830). The new user can be registered as an authorized user of b-lock 601 when, for example, the new user sends the security key to b-lock 601, and b-lock 601 verifies the security key.

Mobile/web application 602B sends a signal to biometric data device 607B to cause biometric data device 607B to obtain biometric data of the new user. Biometric data device 607B can be part of or coupled to a mobile device that is running mobile/web application 602B. For example, biometric data device 607B can be an integrated fingerprint scanner of a mobile device that is running mobile/web application 602B, can be a fingerprint scanner that is plugged into a connector, such as a micro-USB or Lightning connector, of a mobile device that is running mobile/web application 602B, etc. In some embodiments, the new user can use biometric data device 607A or biometric data device 607C to obtain biometric data of the new user. In response to the signal, biometric data device 607B obtains biometric data of the new user, such as by obtaining fingerprint data of the new user (step 870). Biometric data device 607B sends the biometric data to mobile/web application 602B, where the biometric data is received (step 845).

Mobile/web application 602B sends the digital code to b-lock 601 to enable the new user to register as an authorized user of b-lock 601 (step 835). B-lock 601 validates the digital code, such as by unencrypting the digital code to obtain and validate a security key (step 860). Mobile/web application 602B sends the biometric data to b-lock 601 (step 850). Sending the biometric data can include sending a representation of the biometric data. After verifying the digital code and receiving the biometric data, b-lock 601 registers the new user as an authorized user by storing the biometric data in storage, such as non-volatile memory (step 865). Storing the biometric data enables the new user to be identified as an authorized user by comparing biometric data that is received in the future to the stored biometric data. Mobile/web application 602B further sends information as to the period or periods when the new user is authorized to lock and/or unlock b-lock 601. B-lock 601 associates the biometric data with the received period or periods when the new user is authorized to lock and/or unlock b-lock 601.

In some embodiments, mobile/web application 602B send the biometric data to server 609 (step 855), where the data is received (step 815). Server 609 sends a message to mobile/web application 602A that indicates that the new user was registered as an authorized user of b-lock 601 (step 825). In some embodiments, server 609, rather than b-lock 601, compares received biometric data to stored biometric data of an authorized user to determine whether the received biometric data matches the stored biometric data. In some embodiments, server 609 stores biometric data of authorized users for one or more b-locks. If a b-lock breaks down and needs to be replaced, the new b-lock can populate data for authorized users by obtaining the biometric and associated data of the authorized users of the broken b-lock.

In some embodiments, software updates can be pushed to a device with an application installed, such as mobile device with mobile/web application 602A or 602B installed. Software updates can further be pushed to a computing device with an application installed, such as a desktop computer with a web application installed. Software updates can additionally be pushed to a b-lock. For example, server 609 can cause a software update to be applied to a mobile device that is executing mobile/web application 602A, 602B, or can cause an update to be applied to b-lock 601. The software update can be sent to b-lock 601 via a network with which wireless transmitter/receiver 603 can communicate, such as a Wi-Fi network of a physical property for which b-lock 601 is being used to restrict access, or can be sent from any of mobile/web application 602A or 602B to b-lock 601, such as via wireless transmitter/receiver 603, or can be sent via any other compatible way.

Figure 8B:
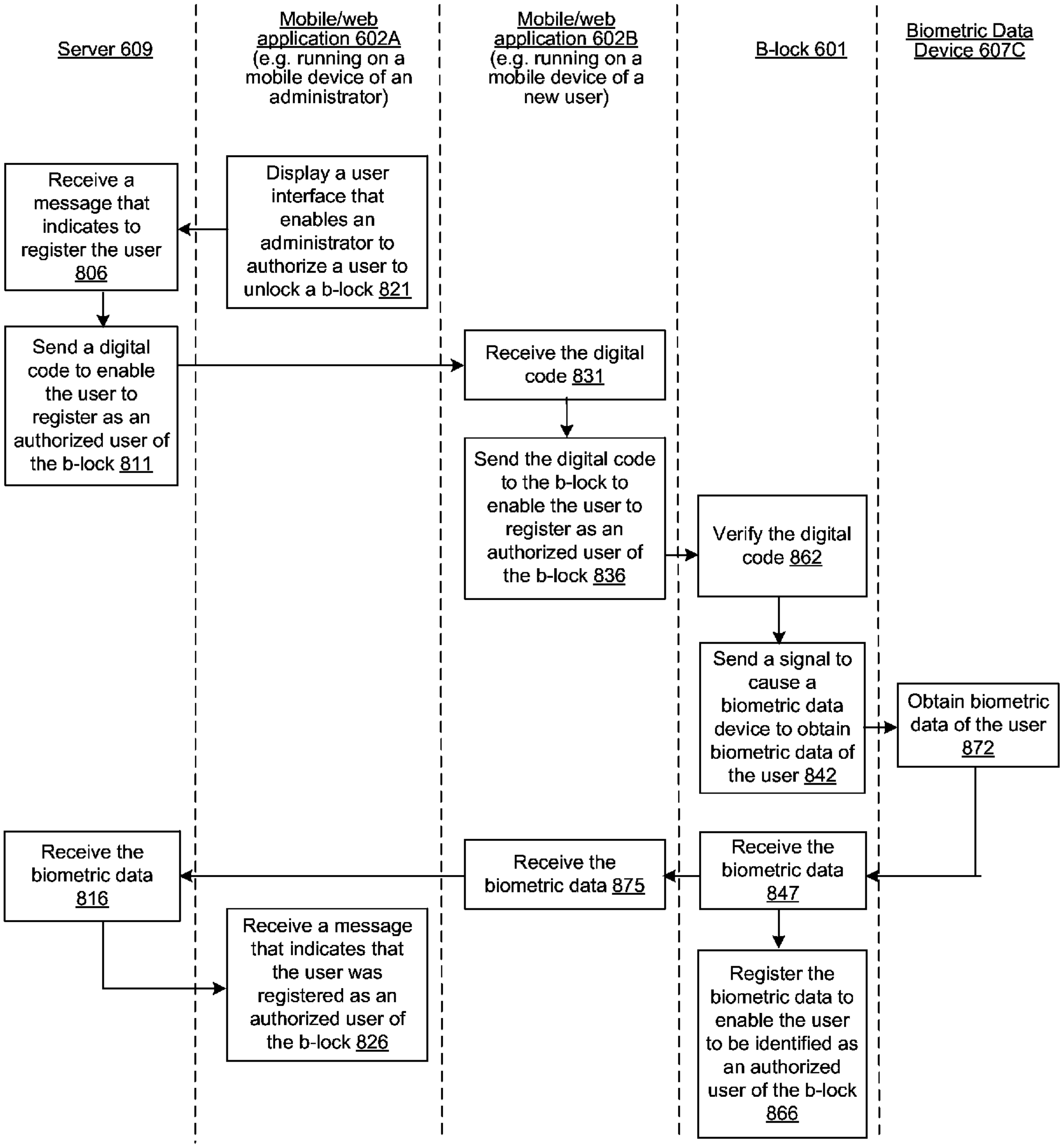

FIG. 8B is an activity diagram illustrating a second example process for managing access to a physical property with access controlled by a b-lock, consistent with various embodiments. The process of FIG. 8B is similar to the process of FIG. 8A, with one point of difference being that, in some embodiments, a biometric data device of a b-lock is used to obtain biometric data of a new user. The description of the example process of FIG. 8B will refer to the embodiment and labels of FIG. 6. Steps 821, 806, 811, 831, and 836 are, respectively, substantially similar to steps 820, 805, 810, 830, and 835 of FIG. 8A. At step 862, b-lock 601 validates the digital code received at step 836, such as by unencrypting the digital code to obtain a security key and validating the security key. B-lock 601 sends a signal to biometric data device 607C to cause biometric data device 607C to obtain biometric data of a new user (step 842). In response to the signal, biometric data device 607C obtains biometric data of the new user, such as by obtaining fingerprint data of the new user (step 872). Biometric data device 607C sends the biometric data to b-lock 601, where the biometric data is received (step 847). B-lock 601 relays the biometric data to mobile/web application 602B, where the biometric data is received (step 875).

After verifying the digital code and receiving the biometric data, b-lock 601 registers the new user as an authorized user, such as by storing the biometric data in storage (step 866). Storing the biometric data enables the new user to be identified as an authorized user by comparing biometric data that is received in the future to the stored biometric data. Mobile/web application 602B can further send to b-lock 601 information as to a period or periods when the new user is authorized to lock and/or unlock b-lock 601. B-lock 601 associates the biometric data with the received period or periods when the new user is authorized to lock and/or unlock b-lock 601.

In some embodiments, mobile/web application 602B sends the biometric data to server 609, where the biometric data is received (step 816). Server 609 sends a message to mobile/web application 602A that indicates that the new user was registered as an authorized user of b-lock 601 (step 826).

Figure 9:
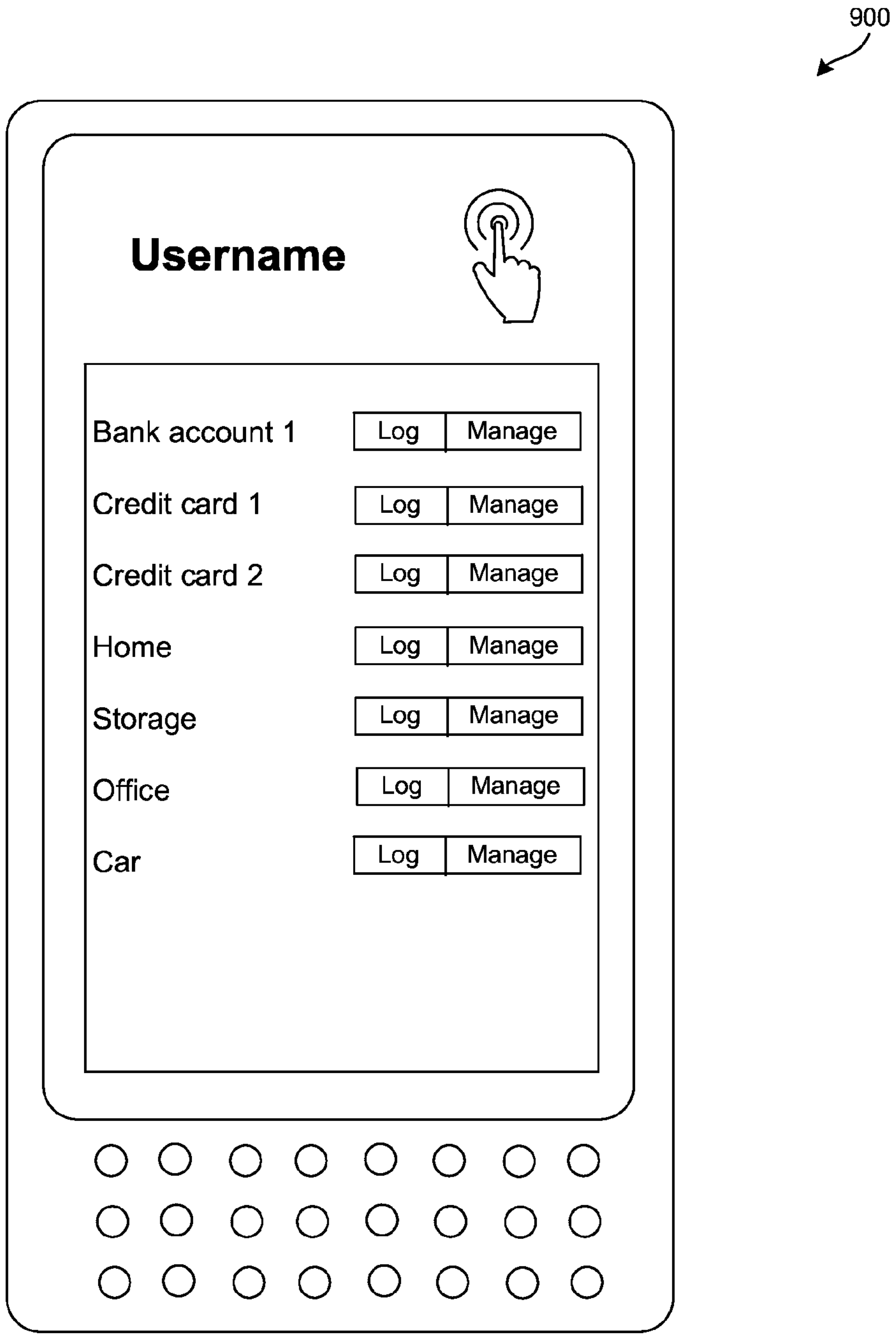
FIG. 9 is an illustration of a user interface for a resource management platform for managing access to shared resources, consistent with various embodiments.

FIG. 9 is an illustration of a user interface for a resource management platform for managing access to shared resources, consistent with various embodiments. As discussed above, in some embodiments, a resource management platform is used to manage access to physical resources, such as homes, offices, cars, etc., that use a b-lock to restrict access to the physical resource.

In some embodiments, a resource management platform is used to manage access to virtual resources, and in other embodiments, to manage access to both physical resources and virtual resources. A virtual resource can be, for example, a bank account, a credit union account, a checking account, a payment card account (e.g., a credit card account, a debit card account, an automated teller machine (ATM) card account, a gift card account, a stored value card account, etc.), a credit account, etc.

A user can create a profile at the resource management platform, can identify each virtual resource that he desires to share with another person, and can input information that enables the platform to access each virtual resource, such as a login ID and password for each virtual resource. The user can use interface 900 of the resource management platform to manage access to, for example, his home, which in this example has access controlled by a b-lock, and his credit card account. The user can touch the "Manage" icon of user interface 900 that is associated with a virtual resource, such as his credit card account.

A second level of user interface can be displayed, and the user can identify a new user with whom he wants to share the virtual resource. The user can provide contact information for the new user, such as an email address of the new user, or a phone number or IP address of a computing device of the new user, such as a mobile device of the new user, etc. The resource management platform can send a message to the new user to enable the new user to register with the resource management platform.

The new user can use, for example, his mobile device to obtain biometric data of a biometrically identifiable part of his body, and can send the biometric data to the resource management platform, where the platform can store the biometric data for future validation of the new user. The user can further identify the resource that he is going to share with the new user, and any access restrictions, such as one or more periods of time that the new user is authorized to utilize the shared resource, or restrictions on his access to the virtual resource, such as being limited to withdraw a maximum amount each day from the user's checking account, or being limited to charge a maximum amount each day using a payment account of the user.

When the new user attempts to access a virtual resource that the user shared with the new user, the resource management platform can send a message to the new user's mobile device that prompts the mobile device to obtain biometric data of the new user. The resource management platform can obtain and validate the biometric data of the new user. Based on this validation, the resource management platform can use, for example, the stored login ID and password of the virtual resource that the user shared with the new user to enable the new user to obtain access to the virtual resource.

Figure 10A:
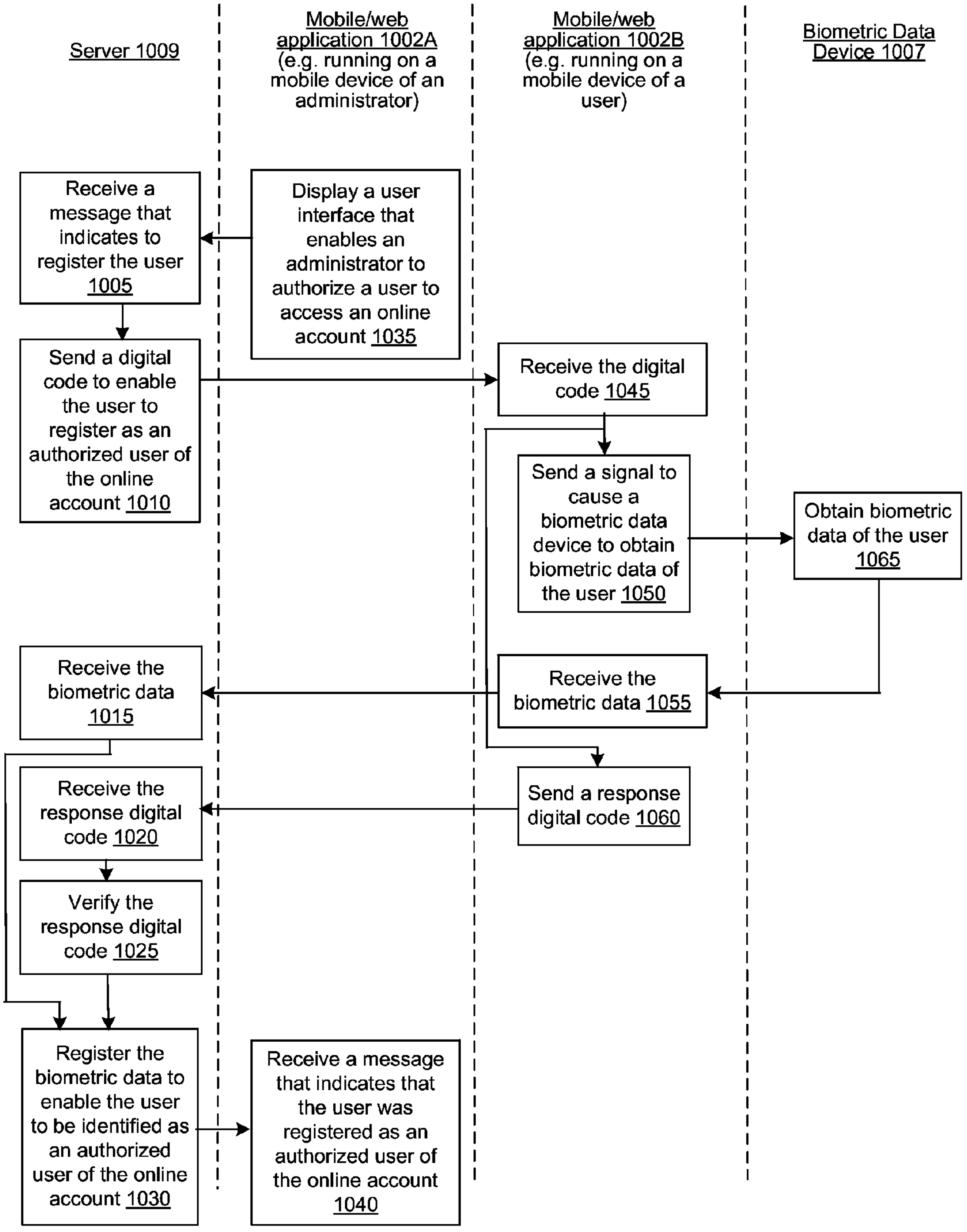
FIGS. 10A and 10B are activity diagrams illustrating an example process for managing and enabling access to a virtual resource, consistent with various embodiments.

FIG. 10A is an activity diagram illustrating an example process for managing access to a virtual resource, consistent with various embodiments. Steps 1035, 1005, 1010, 1045, 1050, 1065, 1055, and 1015 are, respectively, substantially similar to steps 820, 805, 810, 830, 840, 870, 845, and 815 of FIG. 8A, with one point of difference being that the steps of FIG. 10A that are related to authorizing a user to access an online account are, in the associated step of FIG. 8, related to authorizing a user to access a b-lock. In some embodiments, server 1009, mobile/web application 1002A, mobile/web application 1002B, and biometric data device 1007 are, respectively, server 609, mobile/web application 602A, mobile/web application 602B, and biometric data device 607B of FIG. 6.

At step 1060, mobile/web application 1002B sends a response digital code to server 1009. In some embodiments, the response digital code is the same as the digital code received at step 1045. In other embodiments, the response digital code is a security code generated by mobile/web application 1002B based on the digital code received at step 1045. When generated based on the digital code received at step 1045, the response digital code can be verified, such as by server 1009, to be a security code that was generated based the digital code received at step 1045. Mobile/web application 1002B sends the response digital code to server 1009 (step 1060), where the response digital code is received (step 1020). Server 1009 verifies the response digital code (step 1025), such as by verifying that the response digital code is the same as the digital code that was sent to mobile/web application 1002B at step 1010, by verifying that that the response digital code was generated based on the digital code that was sent to mobile/web application 1002B at step 1010, etc.

Upon receipt of the biometric data of step 1015, and based on the verification of step 1025 of the response digital code, server 1009 registers the biometric data to enable the user to be identified as an authorized user of the online account (step 1030). The biometric data can be registered, for example, by storing the biometric data in storage that can be accessed by server 1009, and associating the biometric data with the user. Registering the biometric data enables the user to be identified as an authorized user by comparing biometric data that is received in the future to the registered biometric data. Server 1009 sends a message that indicates that the user was registered as an authorized user of the online account to mobile/web application 1002A, where the message is received (step 1040).

Figure 10B:
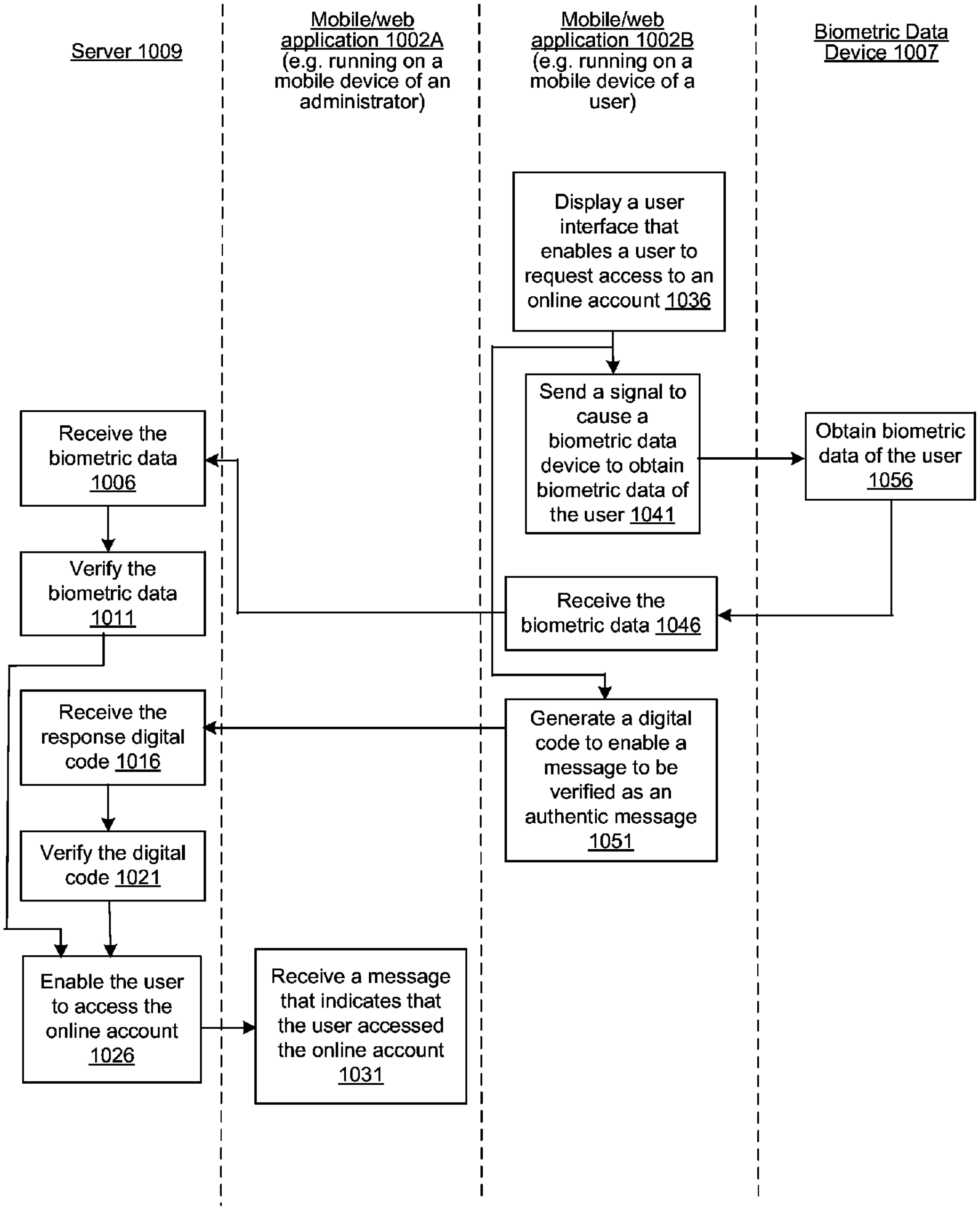

FIG. 10B is an activity diagram illustrating an example process for enabling access to a virtual resource, consistent with various embodiments. Steps 1041, 1056, 1046, and 1006 are, respectively, substantially similar to steps 1050, 1065, 1055, and 1015 of FIG. 10A. At step 1036, mobile/web application 1002B displays a user interface that enables a user to request access to a shared online account, such as an online account of another person. The user can identify a particular online account in any of various ways. For example, the user can indicate the online account he wants to access by selecting a particular online account from a list of online accounts for which he has registered as an authorized user. As a second example, the user can input identifying information for the account, such as a website and user name that can be used to access the account.

Mobile/web application 1002B generates a digital code (step 1051). The digital code can enable a message, such as a message that indicates a request to access an online account, to be verified as being authentic. The digital code of step 1051 can be generated based on, e.g., the digital code received at step 1045. Mobile/web application 1002B sends the digital code to server 1009, where the digital code is received (step 1016). At step 1011, server 1009 verifies the biometric data received at step 1006. The biometric data can be verified by comparing the biometric data against reference biometric data for the user, such as by comparing the biometric data to biometric data that was stored in association with step 1030. At step 1021, server 1009 verifies the digital code received at step 1016.

Upon verification of the biometric data and the digital code, server 1009 enables the user to access the online account (step 1026). For example, server 1009 can act as an intermediary between mobile/web application 1002B and a server that hosts the online account, for example, an online account server. Server 1009 can use the online account owner's login ID and password to login to the online account server. The user, via mobile/web application 1002B, can request certain actions for the online account, such as obtaining an account balance, transferring money between the online account and an account of the user, etc. Server 1009, acting as an intermediary, can cause the requested actions to happen and can report the result of the action back to mobile/web application 1002B. Server 1009 can send a message to mobile/web application 1002A to notify the administrator of the online account that the user accessed the online account (step 1031).

Figure 15:
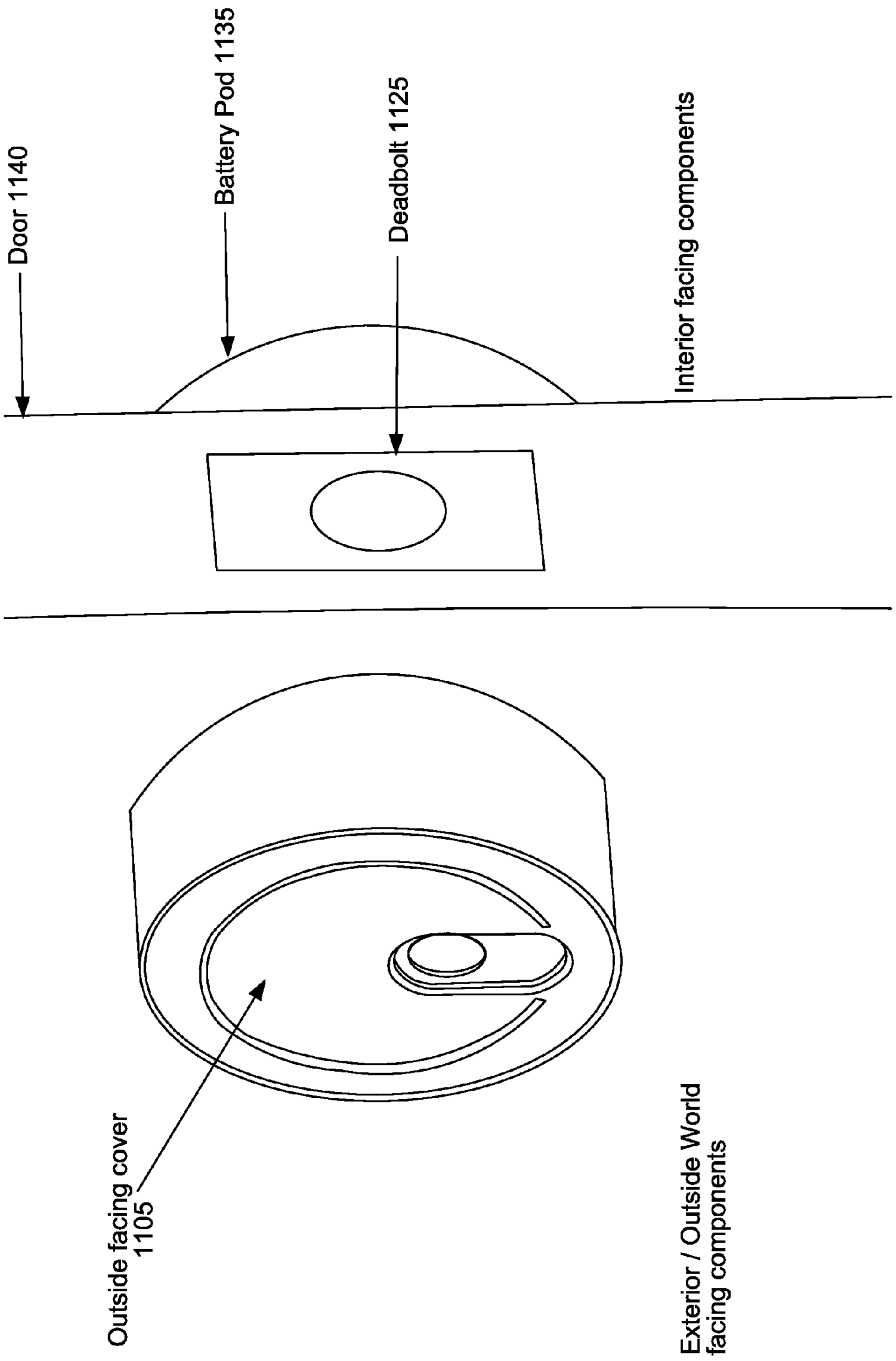
FIG. 15 is an illustration of an angled view of a b-lock that shows both exterior facing and interior facing portions of the b-lock, consistent with various embodiments.

FIG. 11 is an exploded view illustrating the relationship of various components of a b-lock, consistent with various embodiments. B-lock 1100, which in the example of FIG. 11 is mounted in door 1140, includes outside facing cover 1105, circuit board housing 1110, sensors 1115, motor assembly 1120, deadbolt 1125, rotating base 1130, and battery pod 1135. B-lock 1100 can be used to lock, for example, an exterior door of a house. As is illustrated in FIG. 15, the components on one side of door 1140, such as outside facing cover 1105, face the outside world. The components on the other side of door 1140, such as battery pod 1135, face the interior of the house.

Figure 12:
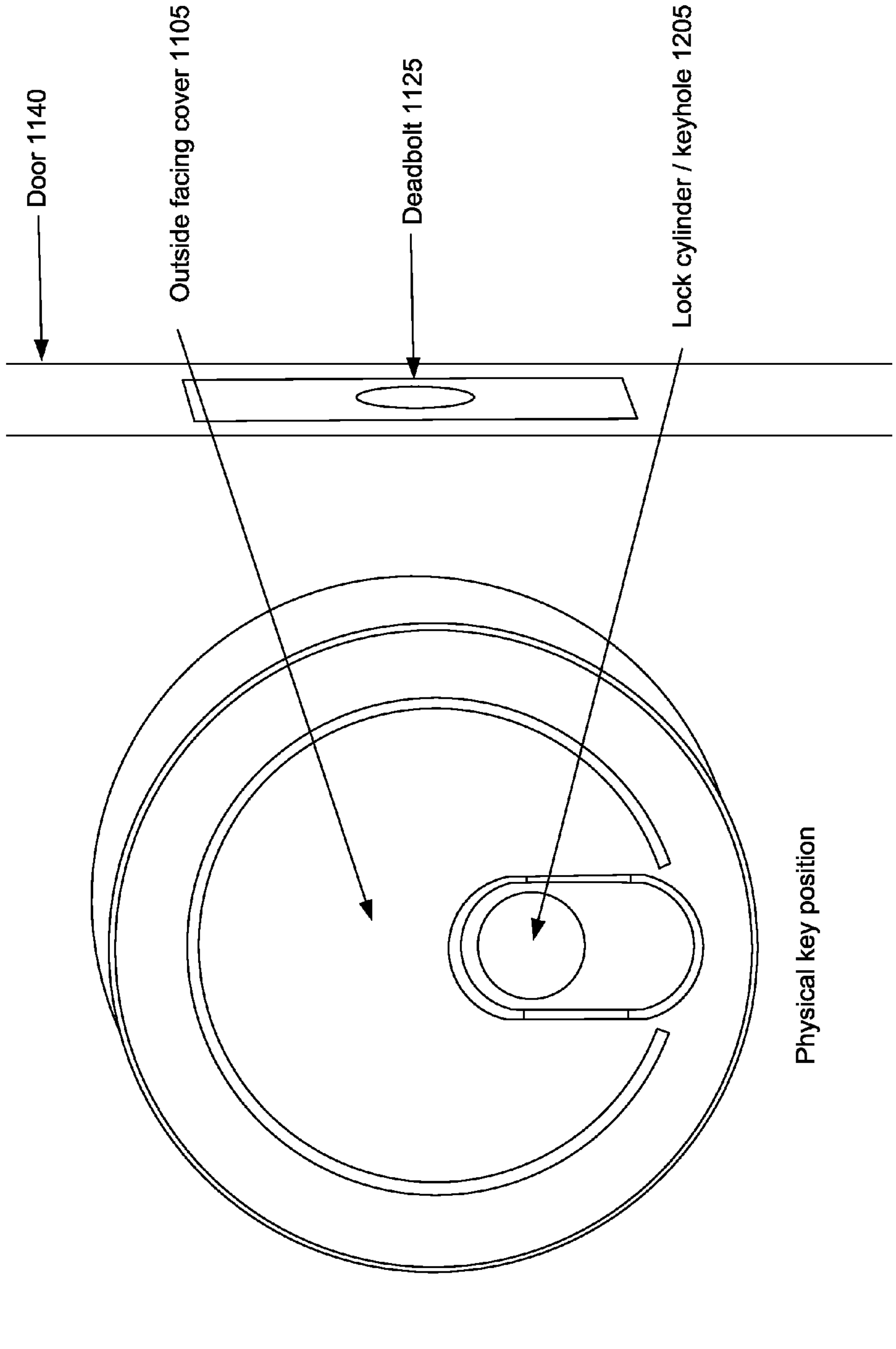
FIG. 12 is an illustration of a front view of a b-lock with a rotating cover with the cover positioned to expose a keyhole, consistent with various embodiments.
Figure 13:
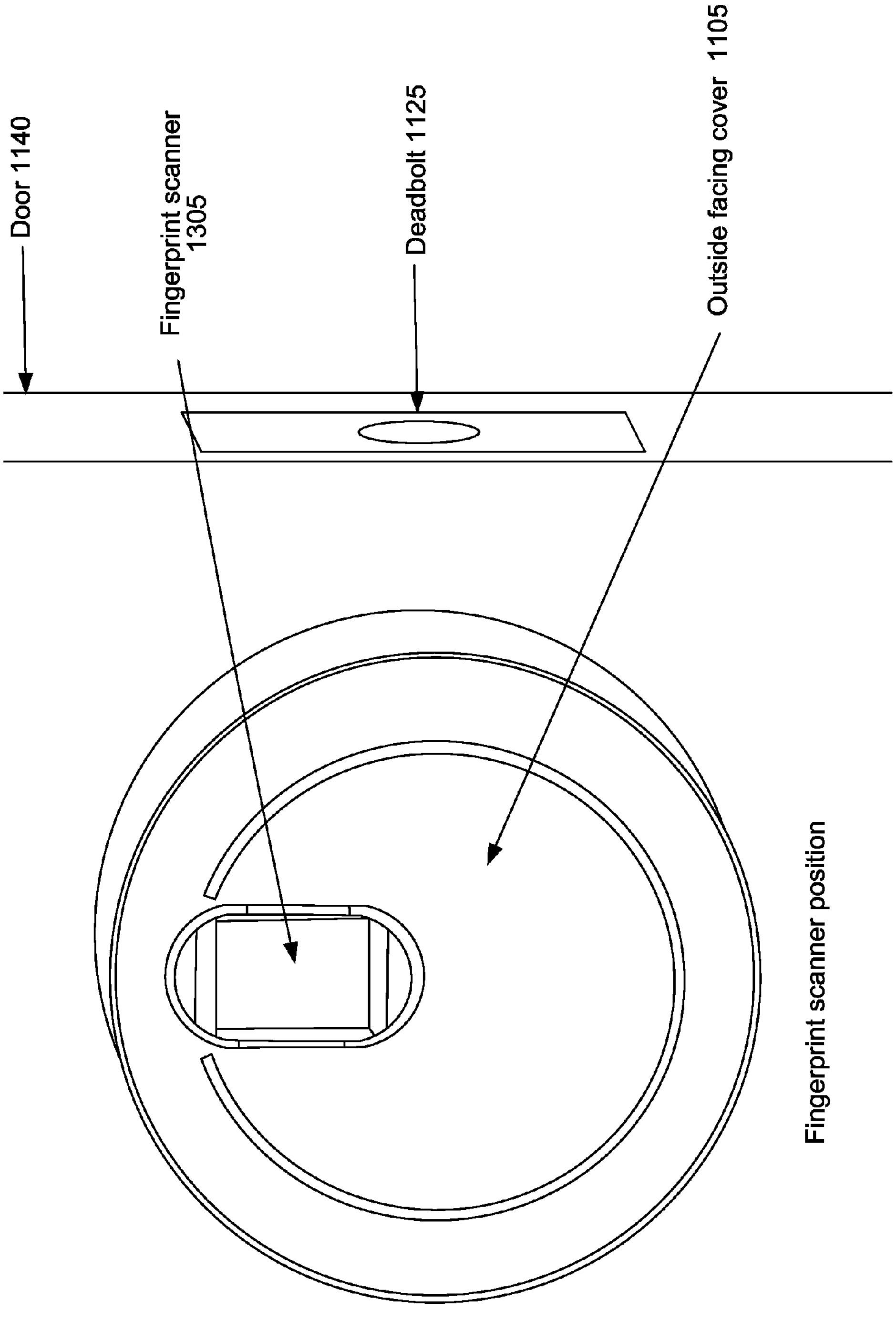
FIG. 13 is an illustration of a front view of a b-lock with a rotating cover with the cover positioned to expose a fingerprint scanner, consistent with various embodiments.
Figure 14:
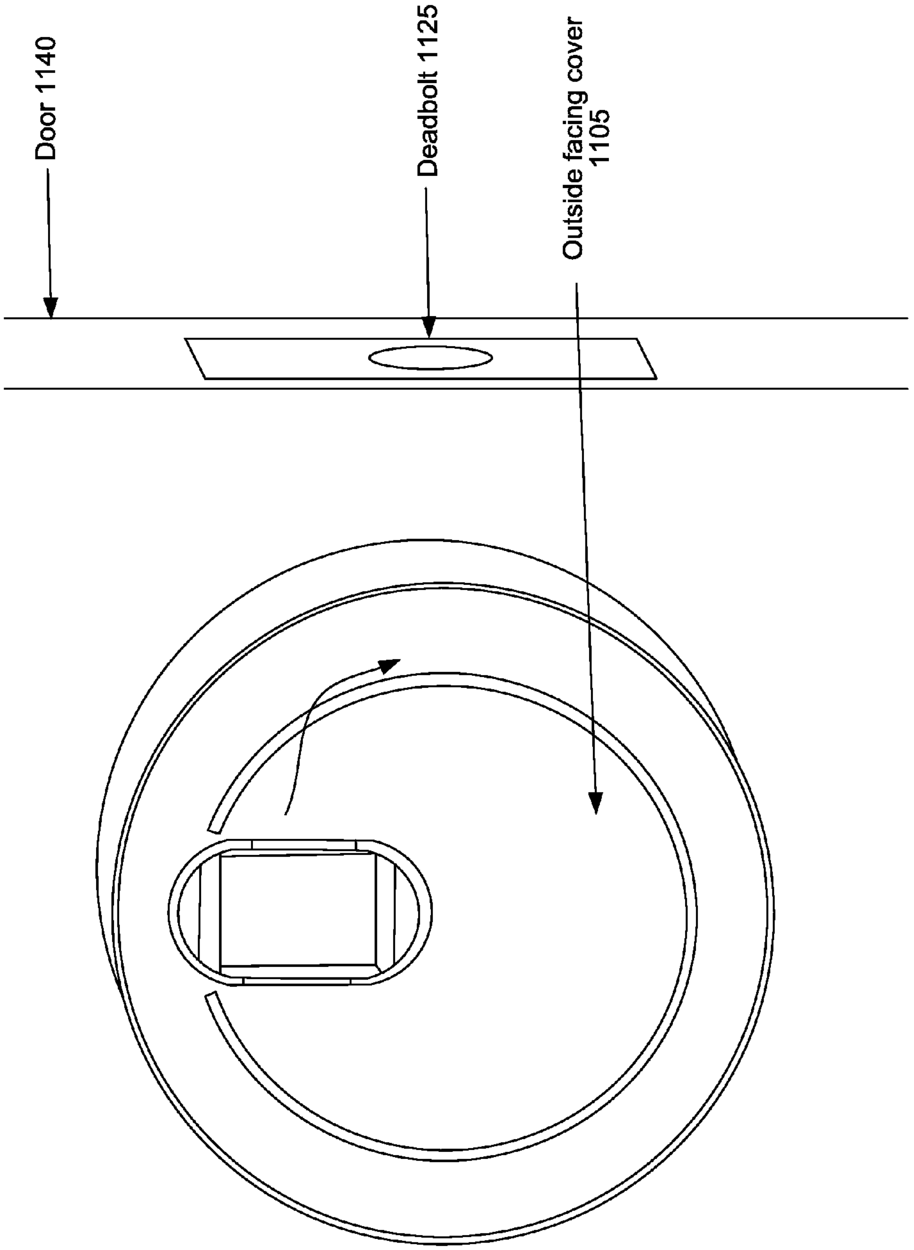
FIG. 14 is an illustration of a front view of a b-lock with a rotating cover, consistent with various embodiments.

As is shown in FIG. 14, outside facing cover 1105 can be rotated. For example, as is illustrated in FIG. 12, outside facing cover 1105 can be rotated to a first position that exposes lock cylinder/keyhole 1205. While in the first position, a user can insert a physical key into lock cylinder/keyhole 1205, and can turn the key in a first direction to extend deadbolt 1125 and lock door 1140, or can turn the key in a second direction to retract deadbolt 1125 and unlock door 1140.

The user can further rotate outside facing cover 1105 to expose one or more other components of b-lock 1100. For example, in FIG. 13 the user has rotated outside facing cover 1105 to a second position that exposes fingerprint scanner 1305. Fingerprint scanner 1305 is a device that can obtain biometric data, such as a user's fingerprint data, that can be used to identify a finger of a user. While in this second position, the user can place his finger on fingerprint scanner 1305. B-lock 1100, such as via fingerprint scanner 1305, can obtain the user's fingerprint data. If b-lock 1100 verifies that the user's fingerprint data matches fingerprint data of an authorized user of b-lock 1100, b-lock 1100 can determine, such as via a processor coupled to circuit board housing 1110, to lock or unlock b-lock 1100.

In various embodiments, outside facing cover 1105 can be rotated to expose any of various components. For example, outside facing cover 1105 can be rotated to expose a charging port (not pictured). The charging port can be compatible with an industry standard connector, such as a USB connector, a micro USB connector, a Lightning connector, etc., or can be a custom or proprietary connector. The charging port can be used to charge a battery of b-lock 1100. For example, in a situation where the user does not have a physical key that he can insert in lock cylinder/keyhole 1205 to unlock b-lock 1100, the user may need to rely upon being able to unlock b-lock 1100 using his finger. If a battery of b-lock 1100 were discharged, the user may not be able to unlock b-lock 1100 using his finger. For example, if battery 1905 of FIG. 19 were discharged, motor assembly 1120 may not be able to obtain enough power from battery 1905 to provide sufficient mechanical force to move deadbolt 1125.

In a situation where b-lock 1100 is not able to unlock door 1140 due to battery 1905 being discharged, the user can rotate outside facing cover 1105 to expose a charging port, for example, a micro-usb port that can be used to charge battery 1905 and/or to substantially immediately power b-lock 1100. The user can use, e.g., a micro-usb cable connected to a power source to recharge battery 1905 and/or to substantially immediately power b-lock 1100. The user can connect the USB connector of the micro-usb cable to a power source, such as a USB port of a laptop computer, a USB port of a portable battery pack, etc. The user can connect the micro-usb connector of the micro-usb cable to the exposed micro-usb port of b-lock 1100. Once the connections are made, electrical current can flow from the power source to battery 1905 and can recharge battery 1905, and/or can flow to the various components of b-lock 1100, such as to the components inside circuit board housing 1110, to the components of sensors 1115, and to the components of motor assembly 1120.

In embodiments where the charging port substantially immediately powers b-lock 1100, the user can substantially immediately use his finger to cause b-lock 1100 to unlock door 1140. In embodiments where the charging port can be used to charge battery 1905, but not to additionally power b-lock 1100, once battery 1905 is sufficiently recharged, the user can use his finger to cause b-lock 1100 to unlock door 1140.

In some embodiments, the charging port has only a direct connection to the charging circuits and there is no data connection to the digital components of b-lock 1100, such as to microcontroller 304 or 604. By isolating the charging port from the data connections of digital components of b-lock 1100, security is increased by isolating the digital components and associated software from tampering via the charging port.

Circuit board housing 1110 is a housing that includes a circuit board, such as a circuit board that includes a processing system of b-lock 1100. The processing system can include, for example, micro-controller 304 and wireless transmitter/receiver 303 of FIG. 3, micro-controller 604 and wireless transmitter/receiver 603 of FIG. 6, or processing system 2000 of FIG. 20, among other components. Sensors 1115 can include any of various sensors, such as a camera, a microphone, an audio sensor, an accelerometer, a pressure sensor, a location sensor, a global positioning system (GPS) sensor, a temperature sensor, a humidity sensor, a magnetic field sensor, an electric field sensor, a light sensor, an infrared light sensor, or a proximity sensor, among other sensors.

Motor assembly 1120 is a motor assembly that provides mechanical force to extend and retract deadbolt 1125. For example, when a user's identity has been validated based on biometric data of the user and b-lock 1100 determines to unlock door 1140, motor assembly 1120 can retract deadbolt 1125 to unlock the door.

Figure 16:
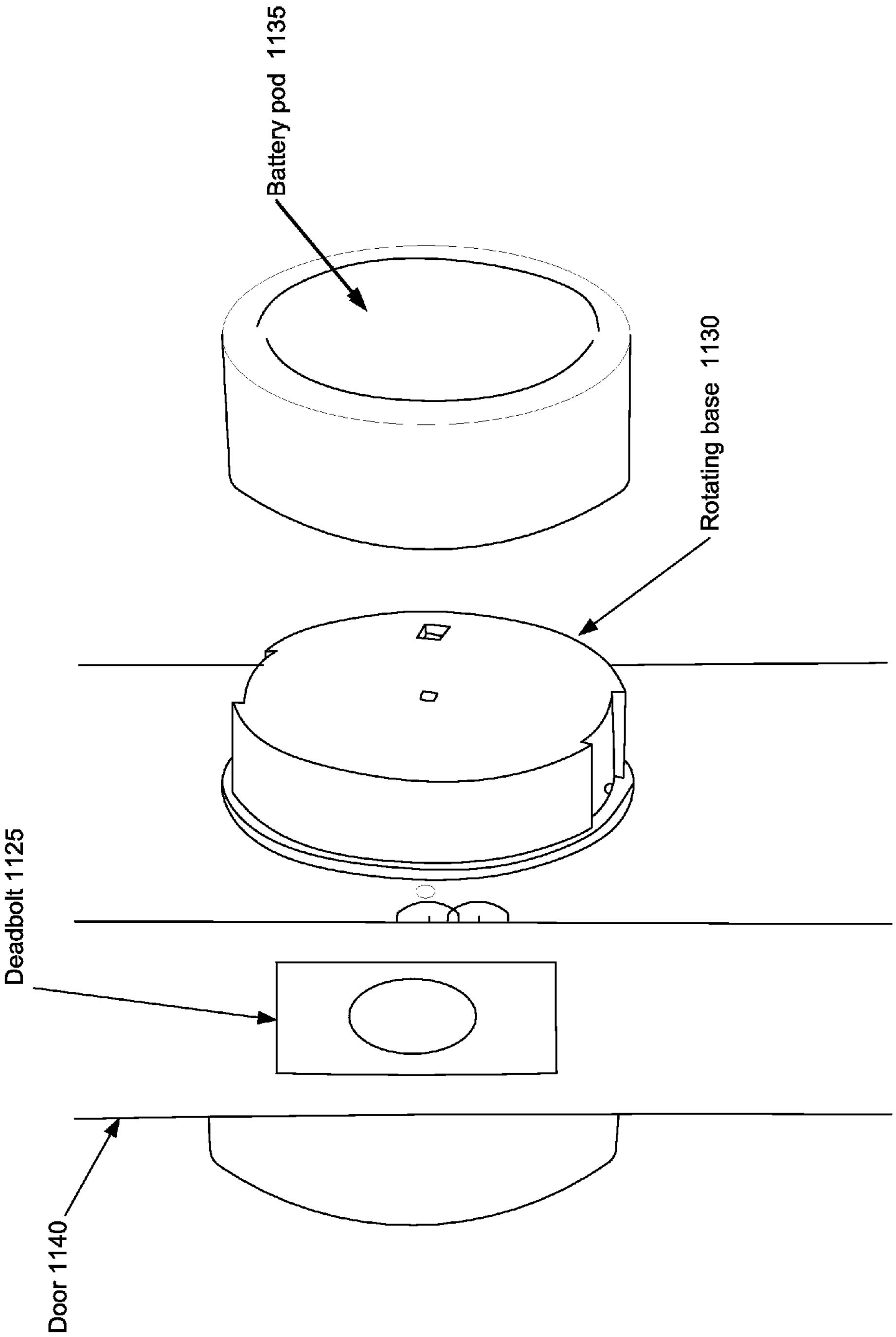
FIG. 16 is an illustration of an angled view of a b-lock that shows a rotating base and a battery pod that has been removed, consistent with various embodiments.
Figure 18:
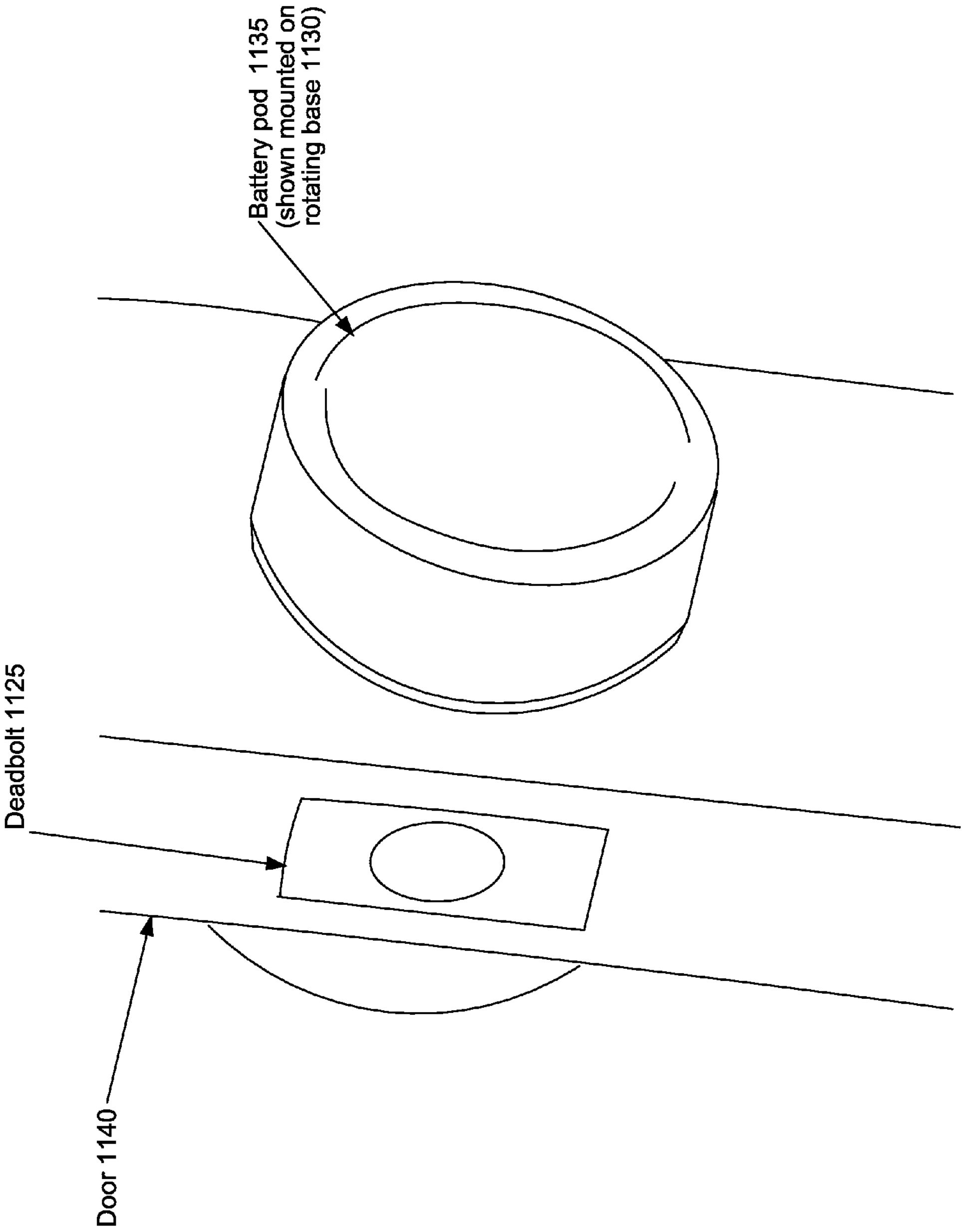
FIG. 18 is an illustration of an angled view of a b-lock that includes a battery pod mounted on a rotating base, consistent with various embodiments.

Rotating base 1130 is a base that can be manually rotated to lock or unlock deadbolt 1125. Battery pod 1135 can be mounted on or otherwise mechanically coupled to rotating base 1130, as is illustrated in FIGS. 16 and 18. Notch 1910 of FIG. 19 can be used to mechanically couple battery pod 1135 to rotating base 1130, such as by locking battery pod 1135 to rotating base 1140, as is illustrated in FIG. 18. As is illustrated in FIG. 15, battery pod 1135 and rotating base 1130, on which battery pod 1135 is mounted, are interior facing components. To open door 1140 from the inside of, for example, a house that includes door 1140, a user can rotate rotating base 1130 by grabbing and rotating battery pod 1135, which is mechanically coupled to rotating base 1130. Battery pod 1135 can provide force to rotate rotating base 1130.

Figure 17:
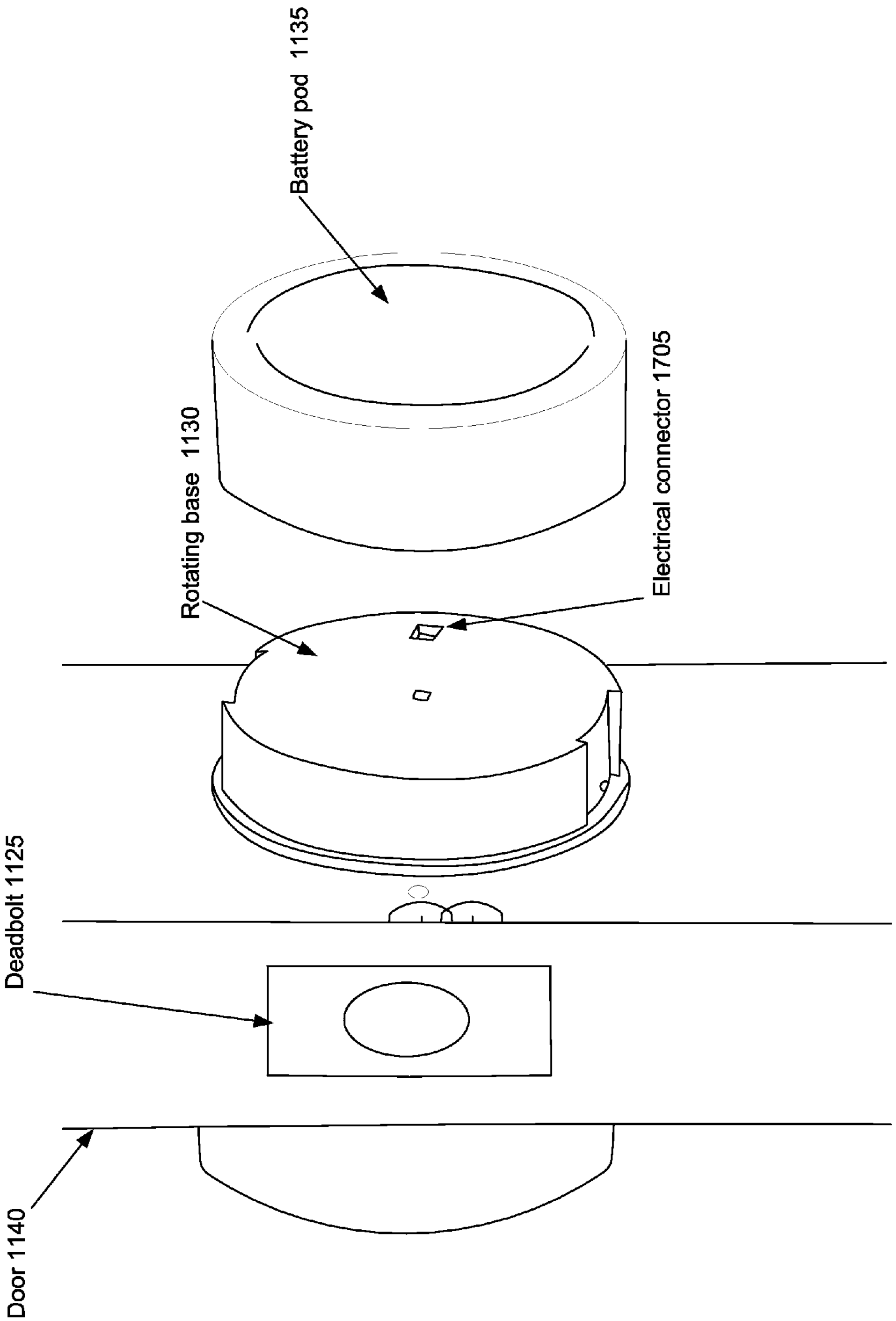
FIG. 17 is a second illustration of an angled view of a b-lock that shows a rotating base and a battery pod that has been removed, consistent with various embodiments.
Figure 19:
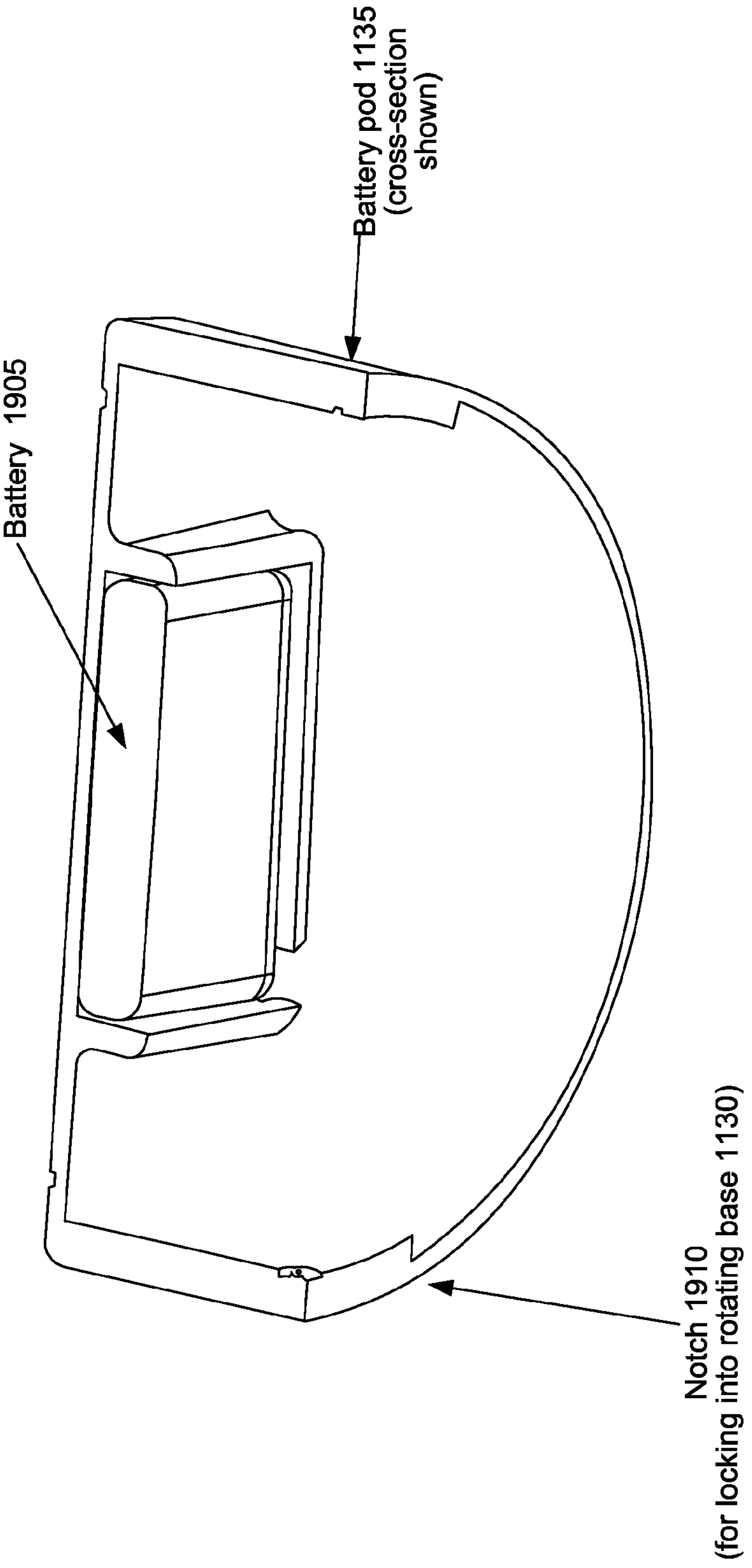
FIG. 19 is a cut-away view of a battery pod, consistent with various embodiments.

Battery pod 1135 is a battery pod for holding batteries. Battery 1905 of battery pod 1135 can be electrically connected to b-lock 1100, for example, by a wire that connects battery 1905 with an electrical connector, such as electrical connector 1705 of FIG. 17. A battery that powers b-lock 1100, such as battery 1905, can be any type of battery, such as a rechargeable battery, a non-rechargeable battery, etc. FIG. 19 shows a cross section of battery pod 1135, and shows the placement of battery 1905 inside of battery pod 1135. A user can detach battery pod 1135 from rotating base 1130, and can remove battery 1905, which can be a single battery or multiple batteries. The user can replace battery 1905 with a new battery or, when battery 1905 is a rechargeable battery, can remove battery 1905 to recharge the battery. In some embodiments, battery pod 1135 includes a charging port, similar to the charging port discussed above, that enables a user to recharge battery 1905 from, for example, the inside of a house for which b-lock 1100 is being used to restrict access.

Figure 20:
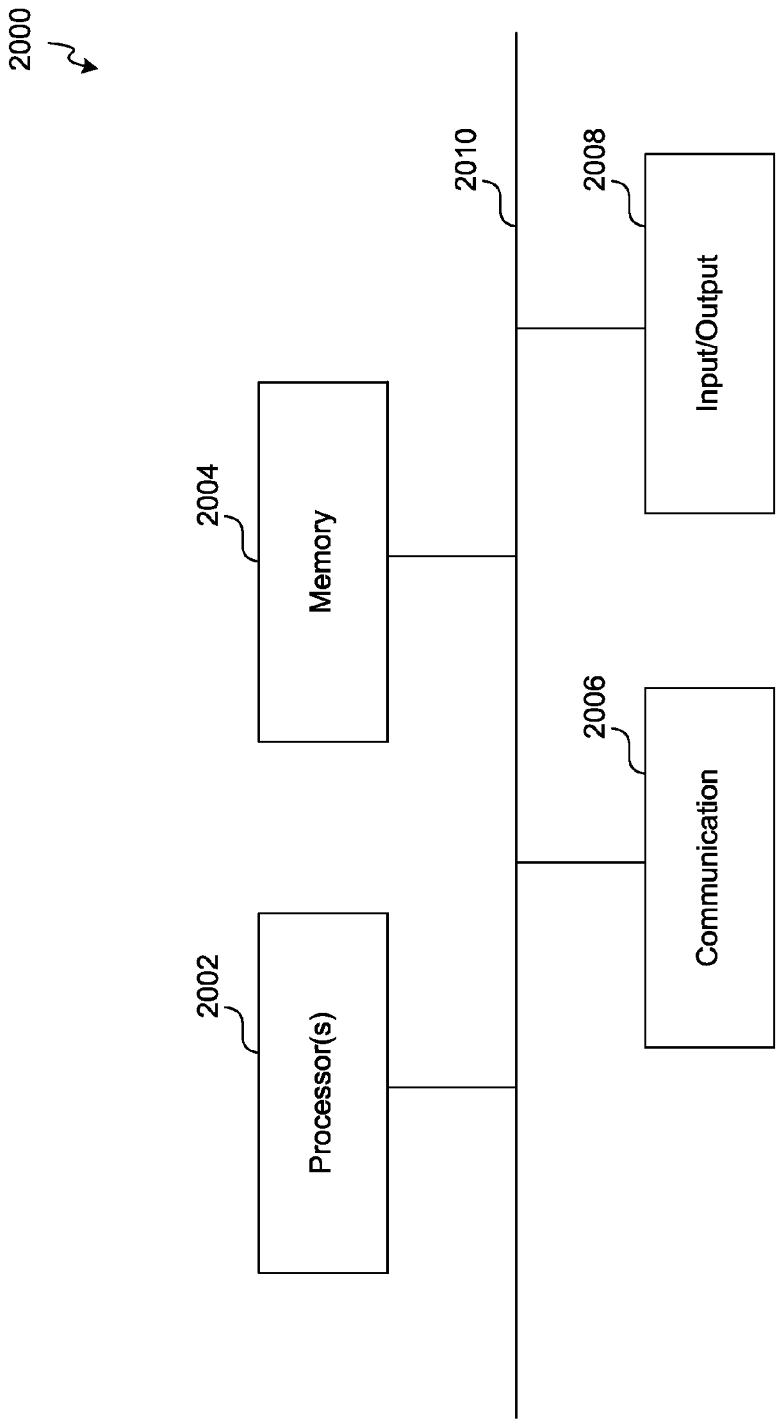
FIG. 20 is a block diagram illustrating an example of a processing system in which at least some operations described herein can be implemented, consistent with various embodiments.

FIG. 20 is a high-level block diagram showing a processing system, consistent with various embodiments, in which at least some operations related to the disclosed technology can be implemented. The embodiment of FIG. 20 can represent, for example, b-lock 301, wireless transmitter/receiver 303, micro controller 304, biometric authentication device 307, b-lock 601, wireless transmitter/receiver 603, micro controller 604, biometric authentication device 607A, 607B, or 607C, server 609, or the computing device on which mobile/web application 302, 602A, or 602B is executed, among others. Any of these processing systems may include two or more processing devices such as represented in FIG. 20, which may be coupled to each other via a network or multiple networks. A network can be referred to as a communication network.

In the illustrated embodiment, the processing system 2000 includes one or more processors 2002, memory 2004, a communication device 2006, and one or more input/output (I/O) devices 2008, all coupled to each other through an interconnect 2010. The interconnect 2010 may be or include one or more conductive traces, buses, point-to-point connections, controllers, adapters and/or other conventional connection devices. Each processor 2002 may be or include, for example, one or more general-purpose programmable microprocessors or microprocessor cores, microcontrollers, application specific integrated circuits (ASICs), programmable gate arrays, or the like, or a combination of such devices. The processor(s) 2002 control the overall operation of the processing device 2000. Memory 2004 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 2004 may store data and instructions that configure the processor(s) 2002 to execute operations in accordance with the techniques described above. The communication device 2006 may be or include, for example, an Ethernet adapter, cable modem, Wi-Fi adapter, cellular transceiver, Bluetooth transceiver, or the like, or a combination thereof. Depending on the specific nature and purpose of the processing device 2000, the I/O devices 2008 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed:

1. An access management platform comprising:

a remote server comprising a processor;

a communication interface coupled to the processor, through which the access management platform can communicate with remote devices; and a remote storage device coupled to the processor, the storage device storing instructions which when executed by the processor cause the access management platform to perform operations including:

displaying a user interface that enables an administrator or owner of a biometric locking device to authorize a user to unlock the biometric locking device;

sending, via the communication interface, an encrypted digital code to a mobile device associated with the user to enable the user to establish, at the biometric locking device, an identity of the user;

receiving, via the communication interface, one or more first messages that indicate:

that the mobile device sent the encrypted digital code to the biometric locking device to establish the identity of the user, that the biometric locking device received reference biometric data, and that the biometric locking device associated the reference biometric data with the identity of the user; and receiving, via the communication interface, one or more second messages that indicate:

that the biometric locking device obtained biometric data of the user, and that the biometric locking device unlocked a locking mechanism of the biometric locking device based on the biometric data matching the reference biometric data.

2. The access management platform of claim 1, wherein the operations further include:

displaying a user interface that enables the administrator or owner to indicate a first time period when the biometric locking device is to unlock the locking mechanism for the user when the biometric data matches the reference finger print data, and a second time period when the biometric locking device is not to unlock the locking mechanism for the user, and sending a third message to the biometric locking device that indicates the first time period and the second time period.

3. The access management platform of claim 1, wherein the user interface enables the owner or administrator to authorize a plurality of users to unlock the locking mechanism of the biometric locking device based on additional reference biometric data that is obtained based on a finger of each of the plurality of users.

4. The access management platform of claim 1, wherein the user interface enables the owner or administrator to authorize the user to open a plurality of biometric locking devices based on the reference biometric data.

5. The access management platform of claim 1, wherein the access management platform is a mobile device.

6. The access management platform of claim 1, wherein the biometric locking device is configured to lock a door of a building.

7. The access management platform of claim 1, wherein the biometric locking device is configured to lock a door of any of a motor vehicle, a safe, or a cabinet.

8. The access management platform of claim 1, wherein the biometric locking device is configured to obtain the biometric data from a biometric sensor of the biometric locking device.

9. An access management platform comprising:

a remote server comprising a processor;

a communication interface coupled to the processor, through which to communicate with remote devices; and a remote storage device coupled to the processor, the storage device storing instructions which when executed by the processor cause the access management platform to perform operations including:

displaying a user interface that enables an account owner to authorize a user to access an online account of the account owner based on biometric data of the user;

sending, via the communication interface, a digital code to a first mobile device to enable the user to register at the access management platform as an authorized user of the online account;

receiving, via the communication interface and from the first mobile device, the biometric data of the user, and a second digital code that was generated in response to receiving the encrypted digital code, wherein the second digital code enables the access management platform to verify that the biometric data of the user is associated with the user;

receiving, via the communication interface and from a second mobile device, second biometric data and an indication of a request to access the online account; and enabling the user to access the online account based on the second biometric data matching the biometric data of the user.

10. The access management platform of claim 9, wherein the first mobile device and the second mobile device are a same mobile device.

11. The access management platform of claim 9, wherein the first digital code and the second digital code are a same digital code.

12. The access management platform of claim 9, wherein the first digital code and the second digital code are encrypted.

13. A method comprising:

displaying a user interface, by a remote computer system, that enables a first user to authorize a second user to unlock a biometric locking device based on biometric data of the second user;

sending a digital code to a mobile device, by the remote computer system, to enable the second user to register as an authorized user at the biometric locking device;

receiving, by the remote computer system, one or more first messages that indicate:

that the mobile device sent the digital code or a transformation of the digital code to the biometric locking device, that the biometric locking device obtained the biometric data of the second user, and that the biometric locking device registered the second user as an authorized user based on the digital code or the transformation of the digital code; and receiving, by the remote computer system, one or more second messages that indicate:

that the biometric locking device obtained second biometric data of the second user, and that the biometric locking device was unlocked based on the second biometric data matching the biometric data of the second user.

14. The method of claim 13, wherein unlocking the biometric locking device includes unlocking a locking mechanism of or associated with the biometric locking device.

15. The method of claim 13, wherein the digital code is a security code, and wherein the transformation of the digital code is a second security code that is generated based on the security code.

16. The method of claim 13, wherein the biometric data of the second user is data obtained by a biometric data device based on a biometrically identifiable body part of the second user, and is data that enables the biometrically identifiable body part to be identified based on second biometric data obtained based on the biometrically identifiable body part.

17. The method of claim 16, wherein the biometric data is fingerprint data, the biometric data device is a fingerprint reader, and the biometrically identifiable body part of the second user is a finger of the second user.

18. The method of claim 13, wherein the remote computer system comprises any of a server, a cloud server, a smart phone, a tablet computer, a wearable computing device, a desktop computer, or a laptop computer.

19. The method of claim 13, wherein the one or more first messages is a message that indicates that the second user was registered as an authorized user by the biometric locking device.

20. The method of claim 13, wherein the one or more second messages is a message that indicates that the biometric locking device was unlocked for the second user.

* * * * *